US009418381B2

United States Patent
Ahuja et al.

(10) Patent No.: US 9,418,381 B2
(45) Date of Patent: Aug. 16, 2016

(54) METHOD AND SYSTEM FOR NOTIFYING CUSTOMERS OF TRANSACTION OPPORTUNITIES

(75) Inventors: Arun Ahuja, Thousand Oaks, CA (US); Ramadurai Vaidyanathan, Thousand Oaks, CA (US); Anand Tata, Moorpark, CA (US); Grigor Markarian, Agoura, CA (US); Joe Pan, Rowland Heights, CA (US); Peter Tompkins, Malibu, CA (US)

(73) Assignee: Citigroup Credit Services, Inc. (USA), Long Island City, NY (US)

( * ) Notice: Subject to any disclaimer, the term of this patent is extended or adjusted under 35 U.S.C. 154(b) by 2360 days.

(21) Appl. No.: 09/832,863

(22) Filed: Apr. 12, 2001

(65) Prior Publication Data

US 2002/0013711 A1   Jan. 31, 2002

Related U.S. Application Data

(60) Provisional application No. 60/197,773, filed on Apr. 14, 2000.

(51) Int. Cl.
*G06F 15/16* (2006.01)
*G06Q 40/02* (2012.01)
(Continued)

(52) U.S. Cl.
CPC .............. *G06Q 40/02* (2013.01); *G06F 17/243* (2013.01); *G06F 17/30345* (2013.01); G06F 17/30861 (2013.01); *G06Q 10/10* (2013.01); *G06Q 20/108* (2013.01); *G06Q 30/0201* (2013.01); *G06Q 40/04* (2013.01); *G06Q 40/06* (2013.01)

(58) Field of Classification Search
CPC ....... G06Q 40/00; G06Q 40/02; G06Q 10/10; G06Q 30/00; G06Q 40/04; G06F 17/243; G06F 17/30345; G06F 17/30861

USPC ......... 709/225, 224, 206, 207, 219, 246, 203, 709/217, 233; 379/67.1, 83, 88.25, 88.26, 379/88.28, 88.13, 88.17, 88.12, 88.14, 379/88.09; 707/1–5, 10, 101, 102, 104, 707/203; 705/35, 37, 42, 36 R
See application file for complete search history.

(56) References Cited

U.S. PATENT DOCUMENTS

| 4,554,418 | A | 11/1985 | Toy ............................ 379/88.01 |
| 5,220,501 | A | 6/1993 | Lawlor et al. ................... 705/40 |

(Continued)

FOREIGN PATENT DOCUMENTS

| EP | 0 745 961 A2 | 12/1996 | ............... G07F 7/08 |
| EP | 1065634 | 1/2001 | |

(Continued)

OTHER PUBLICATIONS

Terveen et al., "Helping Users Program Their Personal Agents", ACM Press SIGCHI Conference, 1996, pp. 355-361.*

(Continued)

*Primary Examiner* — Oleg Survillo
(74) *Attorney, Agent, or Firm* — Eric L. Sophir; Dentons US LLP

(57) ABSTRACT

A standalone notification system, including a notification server which generates electronic messages to registered customers upon their request or upon a host business request. The customer provides the system with his/her messaging identification ("ID"), e.g. e-mail address, GSM (global system for mobile communications) or other mobile phone numbers that are able to accept, e.g., short message service ("SMS") messages, facsimile number, and/or telephone number. Customers can register with the host notification server without having any relationship, banking or otherwise, with the host. Customers can choose between different notification channels such as e-mail, SMS message, fax or pager.

21 Claims, 14 Drawing Sheets

(51) Int. Cl.
  *G06F 17/30* (2006.01)
  *G06F 17/24* (2006.01)
  *G06Q 30/02* (2012.01)
  *G06Q 10/10* (2012.01)
  *G06Q 20/10* (2012.01)
  *G06Q 40/06* (2012.01)
  *G06Q 40/04* (2012.01)

(56) References Cited

U.S. PATENT DOCUMENTS

| | | | |
|---|---|---|---|
| 5,221,838 A | 6/1993 | Gutman et al. | 235/379 |
| 5,465,206 A | 11/1995 | Hilt et al. | 705/40 |
| 5,530,438 A | 6/1996 | Bickham et al. | 340/5.8 |
| 5,640,002 A | 6/1997 | Ruppert et al. | 235/462.46 |
| 5,689,565 A | 11/1997 | Spies et al. | 380/25 |
| 5,706,211 A | 1/1998 | Beletic et al. | 364/514 |
| 5,708,422 A * | 1/1998 | Blonder et al. | 340/5.41 |
| 5,715,020 A | 2/1998 | Kuroiwa et al. | 348/734 |
| 5,742,905 A | 4/1998 | Pepe et al. | |
| 5,744,787 A | 4/1998 | Teicher | 235/380 |
| 5,745,689 A | 4/1998 | Yeager et al. | 395/200.36 |
| 5,748,737 A | 5/1998 | Daggar | 705/41 |
| 5,748,884 A | 5/1998 | Royce et al. | |
| 5,754,111 A | 5/1998 | Garcia | |
| 5,790,677 A | 8/1998 | Fox et al. | 380/24 |
| 5,790,790 A | 8/1998 | Smith et al. | 395/200.36 |
| 5,796,832 A | 8/1998 | Kawan | 705/65 |
| 5,839,052 A | 11/1998 | Dean et al. | 725/106 |
| 5,862,325 A | 1/1999 | Reed et al. | |
| 5,875,302 A | 2/1999 | Obhan | 395/200.55 |
| 5,878,141 A | 3/1999 | Daly et al. | 380/25 |
| 5,878,337 A | 3/1999 | Joao et al. | 455/406 |
| 5,878,403 A | 3/1999 | DeFrancesco et al. | |
| 5,903,652 A | 5/1999 | Mital | 380/25 |
| 5,907,547 A | 5/1999 | Foladare et al. | 370/352 |
| 5,920,847 A | 7/1999 | Kolling et al. | 705/40 |
| 5,944,786 A | 8/1999 | Quinn | 709/206 |
| 5,953,670 A | 9/1999 | Newson | 455/454 |
| 5,959,543 A | 9/1999 | LaPorta et al. | |
| 5,963,925 A | 10/1999 | Kolling et al. | 705/40 |
| 5,969,543 A | 10/1999 | Erickson et al. | |
| 5,987,303 A | 11/1999 | Dutta et al. | 725/106 |
| 5,987,439 A | 11/1999 | Gustin et al. | 705/43 |
| 5,999,624 A | 12/1999 | Hopkins | 380/24 |
| 6,003,019 A | 12/1999 | Eaton et al. | |
| 6,014,636 A | 1/2000 | Reeder | 705/17 |
| 6,029,175 A | 2/2000 | Chow et al. | |
| 6,035,104 A | 3/2000 | Zahariev | 395/200 |
| 6,044,362 A | 3/2000 | Neely | 705/34 |
| 6,049,698 A | 4/2000 | Capers, Jr. et al. | 455/38.2 |
| 6,055,505 A * | 4/2000 | Elston | G06Q 30/0613 705/26.41 |
| 6,055,513 A | 4/2000 | Katz et al. | 705/26 |
| 6,064,990 A | 5/2000 | Goldsmith | |
| 6,078,820 A | 6/2000 | Wells et al. | 455/466 |
| 6,094,643 A | 7/2000 | Anderson et al. | 705/44 |
| 6,094,681 A | 7/2000 | Shaffer et al. | 709/224 |
| 6,128,603 A | 10/2000 | Dent et al. | 705/40 |
| 6,138,158 A | 10/2000 | Boyle et al. | 709/225 |
| 6,167,253 A | 12/2000 | Farris et al. | 455/412 |
| 6,184,878 B1 | 2/2001 | Alonso et al. | 725/109 |
| 6,230,970 B1 | 5/2001 | Walsh et al. | 235/379 |
| 6,269,393 B1 * | 7/2001 | Yost et al. | 709/201 |
| 6,273,334 B1 | 8/2001 | Ijichi et al. | |
| 6,289,324 B1 | 9/2001 | Kawan | 705/41 |
| 6,301,567 B1 | 10/2001 | Leong et al. | |
| 6,311,058 B1 | 10/2001 | Wecker et al. | 455/418 |
| 6,317,885 B1 | 11/2001 | Fries | 725/109 |
| 6,347,307 B1 | 2/2002 | Sandhu | |
| 6,356,752 B1 | 3/2002 | Griffith | 455/406 |
| 6,385,652 B1 | 5/2002 | Brown et al. | 709/227 |
| 6,427,132 B1 | 7/2002 | Bowman-Amuah | |
| 6,449,638 B1 | 9/2002 | Wecker et al. | 709/217 |
| 6,473,794 B1 | 10/2002 | Guheen et al. | |
| 6,477,579 B1 | 11/2002 | Kunkel et al. | 709/229 |
| 6,513,019 B2 * | 1/2003 | Lewis | G06Q 30/04 705/35 |
| 6,535,726 B1 | 3/2003 | Johnson | 455/406 |
| 6,535,855 B1 * | 3/2003 | Cahill | G06Q 30/0281 340/540 |
| 6,536,661 B1 | 3/2003 | Takami et al. | 235/379 |
| 6,553,412 B1 | 4/2003 | Kloba et al. | 709/219 |
| 6,609,106 B1 | 8/2003 | Robertson | 705/26 |
| 6,609,113 B1 | 8/2003 | O'Leary et al. | 705/39 |
| 6,633,910 B1 * | 10/2003 | Rajan et al. | 709/224 |
| 6,651,219 B1 | 11/2003 | Elliott | |
| 6,678,518 B2 | 1/2004 | Eerola | 455/422.1 |
| 6,694,316 B1 * | 2/2004 | Langseth et al. | 707/10 |
| 6,745,229 B1 * | 6/2004 | Gobin et al. | 709/206 |
| 6,748,420 B1 | 6/2004 | Quatrano et al. | |
| 6,792,411 B1 * | 9/2004 | Massey, Jr. | 705/35 |
| 6,952,645 B1 | 10/2005 | Jones | 701/201 |
| 6,965,868 B1 | 11/2005 | Bednarek | |
| 7,043,230 B1 | 5/2006 | Geddes et al. | 455/410 |
| 7,069,234 B1 * | 6/2006 | Cornelius | G06Q 20/10 705/26.35 |
| 7,113,801 B2 | 9/2006 | Back et al. | 455/466 |
| 7,181,417 B1 * | 2/2007 | Langseth | G06Q 30/0621 705/26.5 |
| 7,304,753 B1 * | 12/2007 | Richter et al. | 358/1.15 |
| 7,565,643 B1 | 7/2009 | Sweet et al. | |
| 7,720,742 B1 * | 5/2010 | Mauro et al. | 705/37 |
| 8,112,330 B1 * | 2/2012 | Grandcolas | G06Q 20/108 705/35 |
| 8,527,337 B1 * | 9/2013 | Lim et al. | 705/14.35 |
| 8,671,212 B2 * | 3/2014 | Smith | G06Q 40/00 705/36 R |
| 2001/0041973 A1 | 11/2001 | Abkowitz et al. | 703/23 |
| 2001/0056387 A1 * | 12/2001 | Magary et al. | 705/30 |
| 2001/0056401 A1 | 12/2001 | Tompkins | 705/42 |
| 2002/0013711 A1 | 1/2002 | Ahuja et al. | 705/1 |
| 2002/0035536 A1 | 3/2002 | Gellman | 705/37 |
| 2002/0049788 A1 | 4/2002 | Lipkin et al. | 715/513 |
| 2002/0065752 A1 * | 5/2002 | Lewis | 705/35 |
| 2002/0065758 A1 * | 5/2002 | Henley | 705/37 |
| 2002/0065774 A1 | 5/2002 | Young et al. | 705/41 |
| 2002/0073236 A1 | 6/2002 | Helgeson et al. | 709/246 |
| 2002/0133462 A1 | 9/2002 | Shteyn | 705/44 |
| 2002/0136214 A1 | 9/2002 | Do et al. | |
| 2002/0138389 A1 * | 9/2002 | Martone | G06F 17/30861 705/36 R |
| 2003/0009426 A1 | 1/2003 | Ruiz-Sanchez | 705/78 |
| 2003/0046689 A1 | 3/2003 | Gaos | |
| 2003/0061132 A1 | 3/2003 | Yu, Sr. et al. | |
| 2003/0195797 A1 * | 10/2003 | Klug | 705/10 |
| 2004/0006509 A1 * | 1/2004 | Mannik et al. | 705/14 |
| 2004/0006538 A1 | 1/2004 | Steinberg et al. | 705/39 |
| 2004/0039671 A1 * | 2/2004 | Smith | G06F 19/324 705/35 |
| 2004/0133460 A1 | 7/2004 | Berlin et al. | |
| 2004/0158829 A1 | 8/2004 | Beresin et al. | 717/178 |
| 2005/0004978 A1 | 1/2005 | Reed | G06Q 30/0601 709/203 |
| 2005/0027610 A1 | 2/2005 | Wharton | 705/26 |
| 2005/0027612 A1 | 2/2005 | Walker et al. | |
| 2005/0176449 A1 | 8/2005 | Cui et al. | 455/466 |
| 2006/0031784 A1 | 2/2006 | Makela | 715/850 |
| 2006/0080200 A1 * | 4/2006 | Ashton et al. | 705/35 |
| 2006/0094411 A1 | 5/2006 | Dupont | 455/417 |
| 2007/0060206 A1 | 3/2007 | Nielsen et al. | 455/566 |
| 2008/0096535 A1 | 4/2008 | Kim | 455/414.1 |
| 2008/0126986 A1 | 5/2008 | Tsukiji | 715/810 |
| 2008/0307040 A1 * | 12/2008 | So | 709/203 |
| 2010/0332414 A1 * | 12/2010 | Mead et al. | 705/36 R |

FOREIGN PATENT DOCUMENTS

| | | | |
|---|---|---|---|
| EP | 1 146 459 A | 10/2001 | G06F 17/60 |
| EP | 1 489 535 | 12/2004 | G06F 17/60 |
| EP | 1 168 293 | 7/2006 | G09G 5/00 |
| FR | 2 726 146 | 4/1996 | H04N 7/173 |
| GB | 2 333 421 | 7/1999 | H04Q 7/22 |
| WO | WO 97/22060 | 6/1997 | G06F 17/00 |

(56) References Cited

FOREIGN PATENT DOCUMENTS

| WO | WO 98/09260 | 3/1998 | ............... G07F 19/00 |
|---|---|---|---|
| WO | WO 98/24040 | 6/1998 | ............... G06F 17/06 |
| WO | WO9839868 | 9/1998 | |
| WO | WO 99/13421 | 3/1999 | ............... G06F 17/60 |
| WO | WO 99/14711 A2 | 3/1999 | ............... G07F 19/00 |
| WO | WO 99/14711 A3 | 3/1999 | ............... G07F 19/00 |
| WO | WO 99/35595 | 7/1999 | ............... G06F 17/30 |
| WO | WO 00/46769 | 8/2000 | ............... G07F 19/00 |
| WO | WO 00/79818 | 12/2000 | ............... H04Q 7/32 |
| WO | WO 02/33615 | 4/2002 | ............... G06F 17/60 |
| WO | WO 2004/112275 | 12/2004 | ............... H04B 5/00 |
| WO | WO 2005/079254 | 9/2005 | |

OTHER PUBLICATIONS

Neely, Michelle; "What Price Convenience? The ATM Surcharge Debate"; Jul. 1997; The Regional Economist; pp. 1-10; retrieved at http://www.stlouisfed.org/publications/re/articles/?id=1783 on Jan. 3, 2011.*
www.banknetindia.com/issues/alert.htm, Mar. 21, 2001.
www.isolv.co.in/products.html, Mar. 21, 2001.
www.isolv.co.in/Citibank.html, Mar. 21, 2001.
www.isolv.co.in/etcitialert.html, Mar. 21, 2001.
www.isolv.co.in/fexcitialert.html, Mar. 21, 2001.
www.isolv.co.in/infolineca.html, Mar. 21, 2001.
Roselinsky, Milt, *Telecommunications*, "Ready for Prime Time", Jun. 1999, pp. 5-8.
Wolfe, Devin, *Network, NA*, "The Promise of Unified Messaging", May 1, 1999, pp. 8-13.
Bonner, Paul, *Windows Sources*, v4, n11,"Cookie Recipes for Webpage Builders", Nov. 1997, pp. 13-15 and 20-21.
Earls, Alan, *Informationweek*, 1999, n. 718, PGA1, "True Test of the Web—As the Web Moves to the Core of Business, Testing of Applications and Infrastructure Is More Important Than Ever", pp. 21-27.
European Search Report for Application No. EP 07 10 5497, dated Aug. 20, 2007.
Preliminary Examination Report for Application No. PCT/US01/03202, dated Sep. 24, 2002 (mailing date).
European Search Report for Application No. EP 06 12 4645, dated Apr. 5, 2007.
Written Opinion for Application No. PCT/US01/03202, dated Jun. 11, 2002 (mailing date).
"CitiConnect Escrow Service, a Web-Enabled Escrow Service from Citibank" [online], Copyright 2001 [retrieved on Nov. 26, 2001], 5 pp., Retrieved from the Internet: http://www.citigroup.com/citigroup/net/b2b/ccon.htm.
"CitiConnect" [online], Copyright 2001 [retrieved on Nov. 26, 2001], 1 p., Retrieved from the Internet: http://www.citissb.com/citiConnect/main.htm.
International Search Report for Application No. PCT/US01/03202, dated Jun. 18, 2001 (mailing date).
International Search Report dated Apr. 12, 2001.
"Citibank Brings CitiAlert to India—Expands Remote Banking Services with India's First Internet and Mobile-Based Money Alert Service" [online], Oct. 18, 2000 [retrieved on Mar. 21, 2001], 2 pp., Retrieved from the Internet: http://www.isolv.co.in/citibank.html.
"Citibank Unveils CitiAlert" [online], *Economics Times*, Mumbai, Oct. 18, 2000, Press Release Oct. 19, 2000 [retrieved on Mar. 21, 2001], 1 p., Retrieved from the Internet: http://www.isolv.co.in/etcitialert.html.
"Citibank Rides on Technology with CitiAlert" [online], *The Financial Express*, Mumbai, Oct. 18, 2000 [retrieved on Mar. 21, 2001], 1 p., Retrieved from the Internet:.http://wwwisolv.co.in/fexcitialert.html.
"You've Got Message . . . from CitiAlert" [online], Press Release, Aug. 19, 2000, India Infoline, Oct. 19, 2000 [retrieved on Mar. 21, 2001], 2 pp., Retrieved from the Internet: http://www.isolv.co.in/infolineca.html.
"Mobile Commerce" [online], Copyright 2000 [retrieved on Dec. 29, 2000], 1 p., Retrieved from the Internet: http://www.3rdfrontier.com/mobilecomm.htm.
"Boost Value Added Services with SIM Application Toolkit" (A White Paper), Gemplus, 19 pp., Oct. 8, 1998.
Amato-McCoy, Deena, "Web Bank Plans to Enable TV Access," *Bank Systems & Technology*, v. 35, n. 1, p. 25, Jan. 1998.
Sullivan, Eamonn, "Invasion-of-Privacy Fears Can Be Based on Fiction, Not Fact," v. 14, n. 23, pp. 44, Jun. 9, 1997.
"Dispensing With the Cheque: Part 5 Debit Cards, Smart Cards, Clearing & Settlement, Home-Banking," *Electronic Payments International*, n. 101, p. 8, Oct. 1995.
"VISA Acquires Electronic Banking and Bill Payment Operation," *PR Newswire*, Aug. 3, 1994.
European Search Report for Application No. EP 01 91 2682, dated Jun. 8, 2004 (mailing date).
Gray Denise, "Here Comes Home Banking—Again," *Credit Card Management*, p. 54, May 1994.
Kennedy, Carolyne, "EDS, France Telecom, U.S. West Form Interactive Transaction Services Partnership," *Business Wire*, s. 1, p. 1, Nov. 17, 1993.
After Singapore, India Gets 'CitiAlert', 2000, downloaded from the internet at http://www.bankofindia.com/issues/alert.htm on Mar. 21, 2001, 1 page.
CitiAlert, 2000, downloaded from the internet at http://www.isolv.co.in/products.html on Mar. 21, 2001, 1 page.
Electronic Commerce, 2000, downloaded from the Internet: http://www.3rdfrontier.com/elect.htm on Dec. 29, 2001, 1 page.
European Official Communication issued Jul. 30, 2007 in related Application No. EP01201396, 10 pages.
European Official Communication issued Dec. 17, 2008 in related Application No. EP07105497, 6 pages.
FR2726146 published Apr. 26, 1996, English abstract, downloaded from espacenet, 1 page.
Muller-Veerse, Mobile Commerce Report, 1999, downloaded from internet: http://www.durlacher.com on Apr. 2002, 79 pages.
Varshney et al., Mobile Commerce: A New Frontier, 2000, downloaded from the internet at http://www.computer.org/computer/articles/October/Varshney/Varshney.html on Dec. 28, 2000, 11 pages.
Hesmer, S. "Portlet Development Guide, Working with the Portlet API 1.1," Internet Citation, Apr. 2, 2002, XP002267927, retrieved from the Internet: URL: http://w.bis.business.utah.edu/resources/wps_project.htm [retrieved on Jan. 23, 2004], pp. 1-83.
Extended European Search Report and Written Opinion dated Jun. 12, 2012, issued in a co-pending European patent application No. 05802843.2, filed Mar. 29, 2007.
"The Java 2 Enterprise Edition Developer's Guide, Version 1.2.1," Sun Microsystems, Internet Citation, May 1, 2000, pp. 1-201, retrieved from the Internet URL:http://java.sun.com/j2eeisdk_1.2.1/devguide1_2_1.pdf [retrieved on Nov. 3, 2006].

* cited by examiner

CITIDIRECT™
First Time Customer Login

31 Enter Customer's LAST NAME

33 Enter Customer's ACCOUNT NUMBER

35 Enter Customer's PIN NUMBER
(If you have not received a PIN NUMBER, dial 1-800-CITIPIN to have your PIN NUMBER mailed to you)

37 Enter Customer's ID NAME
(Must be at least 8 characters in length)

39 Enter Customer's PASSWORD
(Must be at least 6 characters in length)

41 Verify PASSWORD

43 Enter Customer's E-MAIL ADDRESS

CitiDirect™ Notification System

I would like to be notified regarding: (Check all that apply)

- ☐ Checking Account Balance
- ☐ Savings Account Balance
- ☐ Interest Rates
- ☐ Stock Quotes
- ☐ Portfolio Value
- ☐ Credit Specials
- ☐ Other CITIBANK Specials

72

Please notify me through:

- ☐ e-mail
- ☐ HTML
- ☐ Pager
- ☐ Customer Service Representative
- ☐ Mobile Phone Text Messaging
- ☐ XML
- ☐ Facsimile
- ☐ SMS

74

Please notify me:

- ☐ Instantaneously
- ☐ Hourly
- ☐ Daily
- ☐ Weekly
- ☐ Monthly

76

[CREATE REPORT 78]   [CONTINUE]

Report Parameters

Predetermined Parameter Reports

- ☐ Today
- ☐ Daily
- ☐ Weekly
- ☐ Monthly

210

Notification Method

- ☐ e-mail
- ☐ HTML
- ☐ Pager
- ☐ CSR
- ☐ Mobile Phone Text Messaging
- ☐ XML
- ☐ Facsimile
- ☐ SMS

Account

- ☐ Checking Account — Acct. No. 1
- ☐ Checking Account — Acct. No. 2
- ☐ Savings Account — Acct. No. 1
- ☐ Savings Account — Acct. No. 2
- ☐ Money Market — Acct. No.
- ☐ Mutual Fund — Symbol

Date

- ☐ Day
- ☐ Month
- ☐ Range

205

GENERATE REPORT 215

CITIALERT™
First Time Customer Login

61 Enter Customer's FULL NAME

63 Enter Customer's ID NAME
(Must be at least 8 characters in length)

65 Enter Customer's PASSWORD
(Must be at least 6 characters in length)

67 Verify PASSWORD

69 Enter Customer's E-MAIL ADDRESS

CITIALERT™ Notification System

I would like to be notified regarding:
(Check all that apply)

- ☐ Interest Rates
- ☐ Stock Quotes
- ☐ Credit Specials
- ☐ Other CITIBANK Specials

82

Please notify me through:

- ☐ e-mail
- ☐ HTML
- ☐ Pager
- ☐ CSR
- ☐ Mobile Phone Text Messaging
- ☐ XML
- ☐ Facsimile
- ☐ SMS

84

Please notify me:

- ☐ Instantaneously
- ☐ Hourly
- ☐ Daily
- ☐ Weekly
- ☐ Monthly

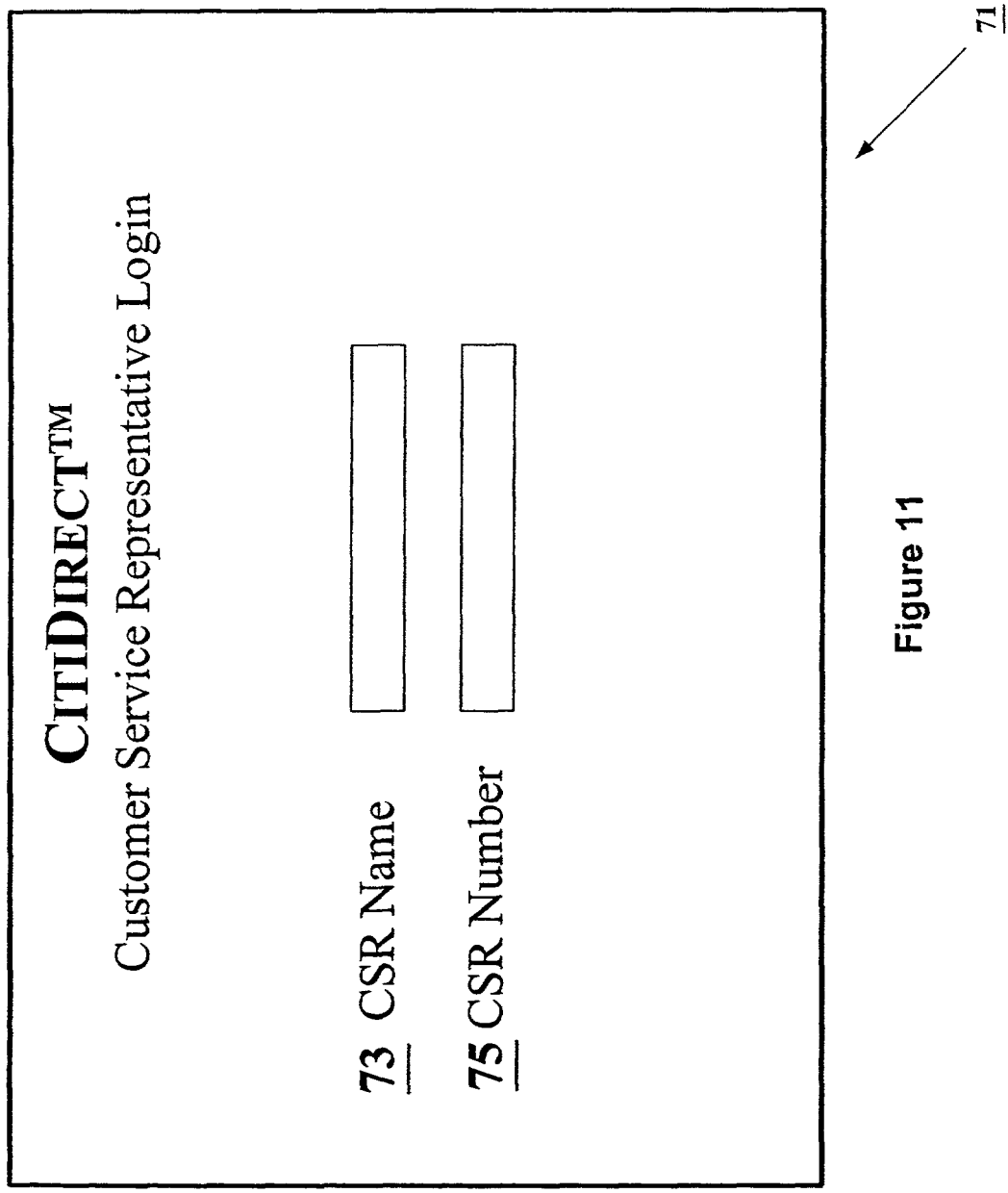

CITIDIRECT™ Customer Service Rpresentative Notification System

96 Customer's Identification Number (CIN) [____]

Customer to be notified regarding:
(Check all that apply)

☐ Checking Account Balance
☐ Savings Account Balance
☐ Interest Rates
☐ Stock Quotes
☐ Portfolio Value
☐ Credit Specials
☐ Other CITIBANK Specials

92

Please notify customer through:

☐ e-mail
☐ HTML
☐ Pager
☐ CSR
☐ Mobile Phone Text Messaging
☐ XML
☐ Facsimile
☐ SMS

94

Please notify customer:

☐ Instantaneously
☐ Hourly
☐ Daily
☐ Weekly
☐ Monthly

METHOD AND SYSTEM FOR NOTIFYING CUSTOMERS OF TRANSACTION OPPORTUNITIES

CROSS-REFERENCE TO RELATED APPLICATIONS

The current application claims priority to provisional application No. 60/197,773 filed Apr. 14, 2000 entitled, "METHOD AND SYSTEM FOR NOTIFYING CUSTOMERS OF TRANSACTION OPPORTUNITIES," which is incorporated herein by reference in its entirety.

BACKGROUND OF THE INVENTION

1. Field of the Invention

This invention relates to financial transaction notification systems and methods, generally. Particularly, this invention relates to systems and methods for collecting, monitoring, and comparing data to customer requests.

2. Description of Related Art

Prior to the current invention, available event notification systems included, for example, local desktop notification systems, such as e-mail alerts or instant messaging alerts which alert a user through a visual or audio signal that a new e-mail or instant message has arrived and is available for retrieval within the users local computer network. These alerts merely indicate that a message is available for viewing, the alerts do not provide the substance of the message.

Other event notification systems alert a user via, for example, an e-mail message, of the availability of certain information, solicited or unsolicited, on the Internet or World Wide Web through a specified Web site or universal resource locator ("URL"). An unsolicited notification includes, for example, the availability of an electronic greeting card (e.g., www.bluemountain.com). A solicited notification provides notification of the availability of information that was specifically requested by the user. For example, at www.realtor.com, a registered user can request notification of homes for sale according to pre-defined user parameters, e.g., location, price, number of bedrooms. When homes meeting the registered user's parameters are listed on the www.realtor.com Web site, the Web site sends an e-mail to the registered user indicating that there are homes available for sale fitting the user's parameters and providing the link to the Web site in the e-mail. These types of notification systems are limited to one method of notification, e-mail. Further, the notification system is not linked to any other type of user information, such as user financial information, e.g., bank accounts, credit accounts, investment accounts, that is constantly variable due to the actions of the user, i.e., the actions of the user do not result in a triggering of the alert.

Finally, there are notification systems available wherein a user's local computer is equipped with a data filter that receives and searches incoming data messages, e.g., e-mail messages, intended for the user, for predetermined event information. When the data filter identifies the predetermined event information, a local event indicator, e.g., audio and/or visual, is presented through the user's local computer indicating that a previously specified event has occurred. The user then has a specified amount of time, e.g., 10 seconds, to acknowledge the local event indicator by, for example, clicking on the provided visual alert, e.g., icon. If the user does not acknowledge the local event indicator within the specified amount of time, the user's computer establishes a connection with a server in order to remotely notify the user of the event through a notification method of the user's choice, such as, pager, telephone, or personal digital assistant ("PDA"). This notification system is limited to searching and retrieving local event information from user-intended messages, e.g., Web pages pushed to a users e-mail address. Further, the local events, though pre-defined and requested, are not triggered by user actions, such as financial transactions.

BRIEF SUMMARY OF THE INVENTION

Consequently, there is a need in the art for a notification system that is directly linked to the actions of the user, in addition to the pre-defined parameters selected by the user, wherein such a system collects data independent of any electronic address of the user, i.e., information searched for the requested alert is not limited to messages directed to the user. Further, there is a need for a notification system wherein the requested alerts are triggered based on the values of private customer-specific financial information, such as bank account, credit card, or brokerage portfolio information.

Various embodiments of the present invention comprise a standalone notification system, including a notification server which generates electronic messages to registered customers upon their request or upon a host business request. A customer provides the system with his/her messaging identification ("ID"), e.g. e-mail address, GSM (global system for mobile communications) or other mobile phone numbers that are able to accept, e.g., short message service ("SMS") messages, facsimile number, and/or telephone number. Customers can register with the host notification server without having any relationship, banking or otherwise, with the host. Customers can choose between different notification channels such as e-mail, SMS message, fax or pager.

Further embodiments of the present invention comprise a notification system, which allows host personnel, such as customer service representatives ("CSR"), to create and maintain customer requests on behalf of a customer.

The design of the notification system is geared toward scalability and performance. The notification system ensures a scalable architecture by using a stateless Web site and distributed architecture. The use of a stateless Web site results in increased available memory.

BRIEF DESCRIPTION OF THE DRAWINGS

FIG. 5 is a schematic view of a Web page according to an embodiment of the present invention;

FIGS. 6(a) and 6(b) are schematic views of a Web page according to an embodiment of the present invention;

FIG. 9 is a schematic view of a Web page according to an embodiment of the present invention;

FIG. 10 is a schematic view of a Web page according to an embodiment of the present invention;

FIG. 11 is a schematic view of a Web page according to an embodiment of the present invention;

FIG. 12 is a schematic view of a Web page according to an embodiment of the present invention.

DETAILED DESCRIPTION OF THE INVENTION

Figure 1:
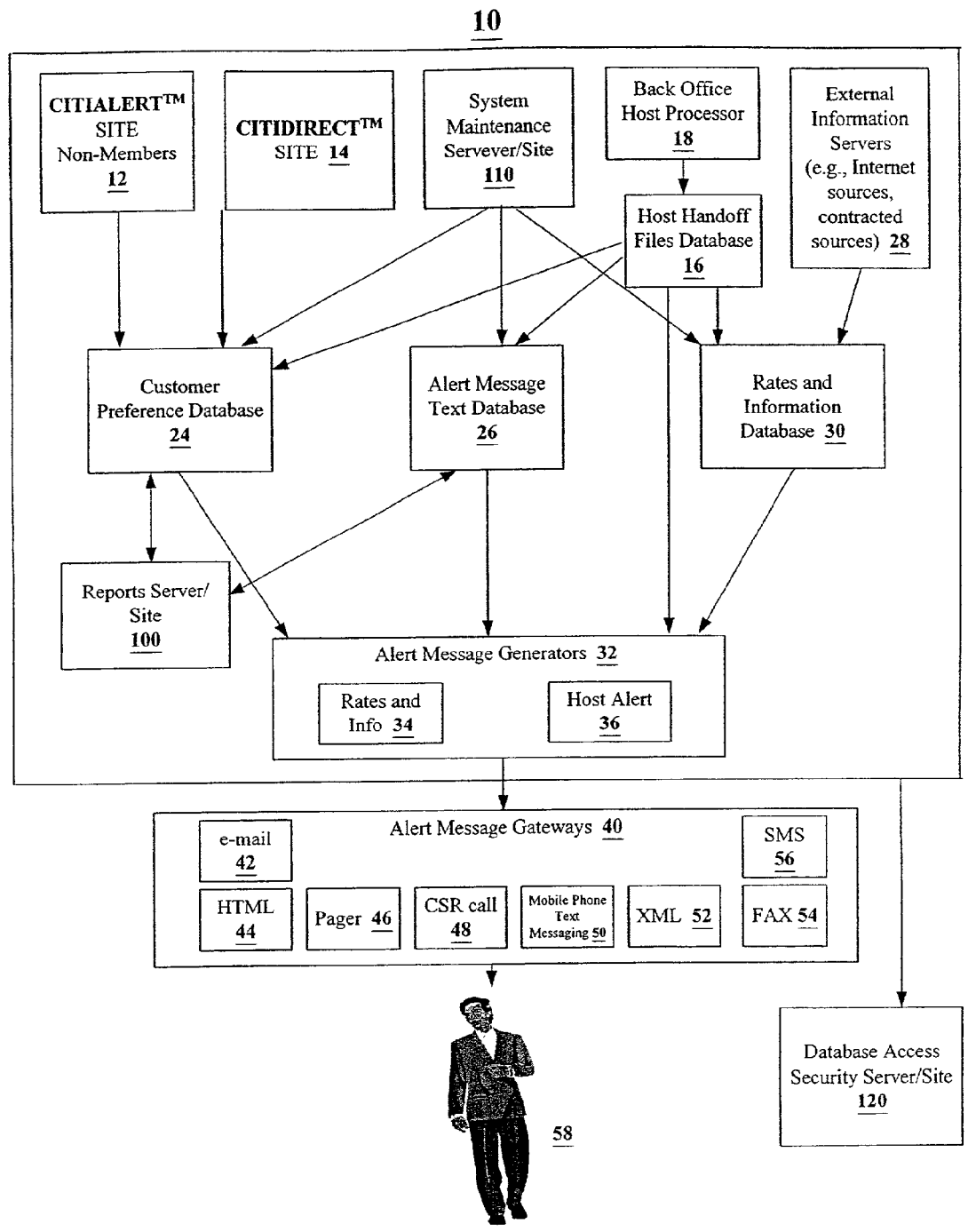
FIG. 1 is a schematic view of a notification system according to an embodiment of the present invention.

The notification system embodied by the present invention is capable of multiple avenues of access to and from multiple parties. Further, the notification system utilizes multiple databases which are fed information via the multiple parties and/or via other servers and/or back office host systems, such as readable files which are updated by running an appropriate executable program.

In an embodiment of the present invention, all live financial information comes from one or more host computers operated by the host financial institution. The information provided by these hosts is presented to the databases and the alert message generators included in the notification system in the form of a "host handoff file" (See FIG. 1). This file represents a data dump from the host database of all information relevant to subscribers on the notification system. These host handoff files may be presented periodically (e.g., once a day) or they can be represented as a live real-time connection between the back office host processor(s) and the notification system.

In at least one embodiment of the present invention, a preferred medium for facilitating all of the customer configuration interactions described below is a public access network, such as the Internet or World Wide Web, due to such a network's far-reaching, efficient and expeditious characteristics for data transmission and presentment. A particularly effective method of displaying and generating data and information is through the use of Web sites and/or Web pages. While the specific schema illustrated in the tables printed below provide the necessary format for collecting and synthesizing data within the databases themselves, the requests for data which are made to or by the customers or CSRs are made through a more user-friendly and recognizable format such as a graphical user interface ("GUI").

In at least one embodiment of the present invention, multiple Web sites are provided to facilitate data collection and presentation. The following, which are in no way intended to be limiting, represent Web sites and Web pages used in a preferred embodiment of the present invention: non-member customer ("NMC") preference site; member customer ("MC") preference site (e.g., CITIDIRECT® customer preference sub applications ("MiniApps") and Transaction executors); CSR preference site; product information, rates and host messages maintenance site; notification reports site; system maintenance site; and database access security site.

In an embodiment of the present invention wherein a sponsoring financial institution or host (hereafter "host") maintains the notification system, the host establishes a central Web site (e.g., homepage) as an advertising and explanatory mechanism as well as the conduit through which MCs, NMCs, and CSRs are able to access their respective login Web pages. The format of the Web sites and Web pages may be HTML, XML, or the like. Depending on which type of customer is attempting to gain access, the customer selects the appropriate link, which links them to a login Web page. Once presented with the selected Web page, the user may be further prompted to select between a "first-time user" and a "repeat user" login link. The difference between these two login links being the amount of information which needs to be entered prior to granting the user access to the preference sites.

Referring to FIG. 1, the notification system 10 is comprised of a system of servers and databases which are accessed via the Internet, through various Web sites, such as a CITIALERT™ non-member Web site 12 and/or a CITIDIRECT® member Web site 14, and a CITIALERT™ maintenance Web site 110. Since the present invention, though affiliated with one or more hosts, does not require that the customers accessing or using the notification system actually have a financial relationship with any one of the controlling hosts, Web site 12 may be used by all customers, including non-member customer ("NMC") (e.g., customers who do not have a relationship with the affiliated host or hosts) while Web site 14 provides access to the notification system 10 to member customers ("MC") only. Web site 110 is used by employees of the hosting financial institution to configure the alert system.

Web sites 12, 14 and 110 feed information, directly and indirectly, to a number of sources. The Web sites 12 and 14 are sources of configuration information related to the specific configuration parameters for each customer (both member and non-member users). The Web site 110 feeds additional configuration information into the system. This Web site is only useable by host employees, and provides configuration information about the nature of the notifications; the text of the notifications; the manner of notification (email, SMS, etc.); and similar system wide configuration information. As discussed below, the invention also contemplates accessing external sources of information. One or more back office host processors 18 provide host handoff files to a host handoff files database 16 which include information that feeds into the customer preference database 24, the alert message text database 26, and the rates and information database 30; and which, in some cases, are processed directly by the alert message generators 32. The information provided by MCs and NMCs to Web sites 12 and 14 is fed into a database containing customer preferences 24. The information provided by the host's maintenance personnel to Web site 110 is fed into the same database containing customer preferences 24, as well as the alert message text database 26 and, potentially, the rates and information database 30. The host-handoff files 16 are fed to all of these databases. Finally, in an embodiment of the present invention, the system uses externally generated data from external sources 28. These externally generated sources include Internet based sources, contracted sources via private lines or any other available sources. They feed information into the rates and information database 30. The rates database contains information including, for example, interest rates and fees on loans and credit cards, interest rates on deposit accounts, foreign exchange rates, etc. The information database contains information including, for example, product information, corporate news, new products or services, etc.

Given the three databases, customer preference 24, alert message 26, and rates and information 30; as well as the information in the host handoff files database 16, alert message generators 32 access the information therein, to form a rates and information alert message generator 34 and a host alert message generator 36. These alert message generators 32, generate the messages requested by the customers, which are stored in an alert message text database 26 prior to being sent to a customer selected alert message gateway 40. As discussed below, these gateways may include but are not limited to e-mail 42, HTML (hypertext mark-up language) 44, pager 46, CSR call 48, mobile phone text messaging, G, Global System for Mobile Communications Service ("GSM") 50, and XML (extensible mark-up language) 52, facsimile 54, and short message service ("SMS") 56. Through these alert message gateways 40, requested information is transmitted to the customer 58.

In embodiments of the present invention, multiple servers may be grouped according to the particular databases into which they are feeding data and information. While not explicitly depicted in the Figures, these servers or feeders are executables that are run through, for example, the system maintenance site, in order to continually update the databases within the notification system. For example, a customer profile server and a rates server both update the customer preference database 24. Similarly, the same rates server and a host handoff server update the host handoff files database 16. While not explicitly depicted in the Figures, the customer profile, rates, and host handoff servers are executables that are launched, for example, through the system maintenance server/site 110. By way of example, prompted by the system maintenance server/site 110, in a specific embodiment of the present invention, the servers read selected information from the up-to-date host handoff files, format the selected information according to a command program and update the aforementioned databases, respectively. Further in this specific embodiment, the customer profile server's functionality is to keep up to date customer profile and customer relationship data. As will be discussed further later in this disclosure, the customer profile server updates only host customer records, such that only MC and not NMC notification set-ups are affected by this server. The host handoff and rate servers functionalities are to import host generated events and to keep the rate related information up to date, respectively.

The alert message generators 32 contemplated by at least one embodiment of the present invention include, a rates and information alert message generator 34 and a host alert message generator 36. Message generators are designed to analyze the customer's preferences against current rates, product information and host handoff data and create entries within the alert message text database 26.

The rates and information message generator(s) 34 is an executable which has direct access to the customer preference database 24, to rates and information database 30 and to alert message text database 26 through database access security server. These executables populate the alert message text database 26 with notification requests based on customer preference specification and rates and info content. Each request record indicates the customers preferred notification channel i.e., alert message gateway. The message generators create the actual message phrases taking into consideration the type of transaction they are reporting on.

The host alert message generator(s) 36 is an executable which has direct access to the customer preference database 24, to host handoff files database 16 and to alert message text database 26 through the database access security server. These executables populate the alert message text database 26 with notification requests based on customer preference specification and host handoff results. Each request record indicates the customer's preferred notification channel. The message generators create the actual message phrases taking into consideration the type of transaction they are reporting on. The alert message gateways 40 are executables which extract the content from the alert message text database 26 based on the customer's preferred notification channel and forward them to the corresponding gateway. Forwarded messages are moved from a "work" table to an "audit" table within the same database. Specific alert message gateway agents will be written for each notification channel such as the FAX or the SMTP (simple mail transfer protocol) mail. In preferred embodiments of the present invention, a web-based product information, rates and host messages maintenance site is provided to update individual rates records, information records, host product records, and to report on statistical usage of the product database. This site is also used to enter the specific response messages sent to the customer for each event.

In preferred embodiments of the present invention, a web-based reports server/site 100 is used to generate MIS (management information system) and marketing reports on the customer preference database 24 and alert message text database 26. The web-based system maintenance server site 110 is used to backup, archive, restore and report on statistical usage of all databases within the notification system 10. This system maintenance server/site 110, in addition to the configuration operations discussed above, is also used to launch and control different server executables and different alert message generators 32. Finally, a web-based database access security server/site 120 is used to control access to databases and servers within the notification system 10. This database access security server/site 120 gives a requesting server the proper database connection string, database login ID, and PASSWORD. The database access security server/site 120 has administrator privileges over all the databases. This server/site 120 solves the problem of hard coding the database login IDs into the operating system registry.

Figure 2:
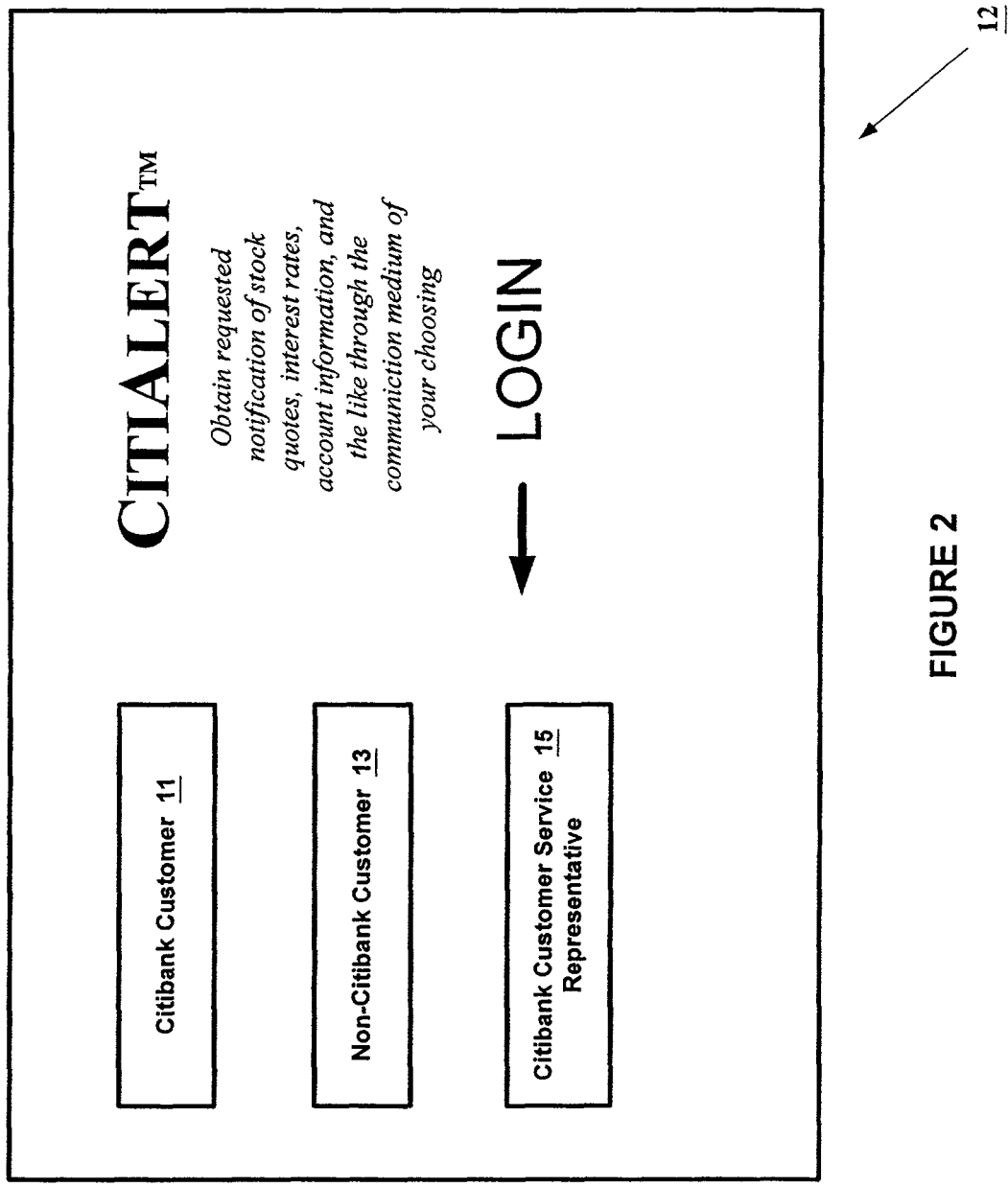
FIG. 2 is a schematic view of a Web page according to an embodiment of the present invention.
Figure 3:
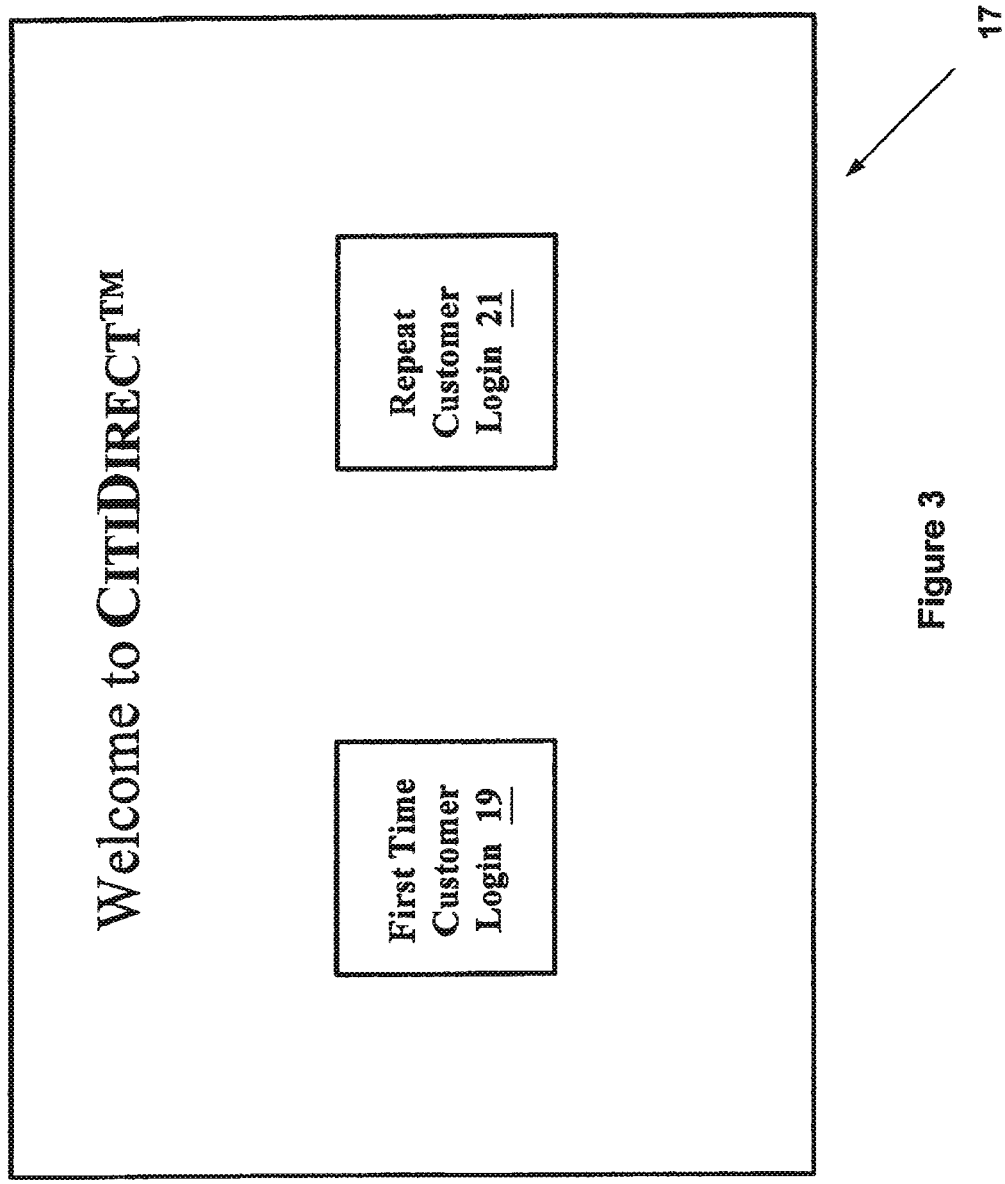
FIG. 3 is a schematic view of Web page according to an embodiment of the present invention.
Figure 4:
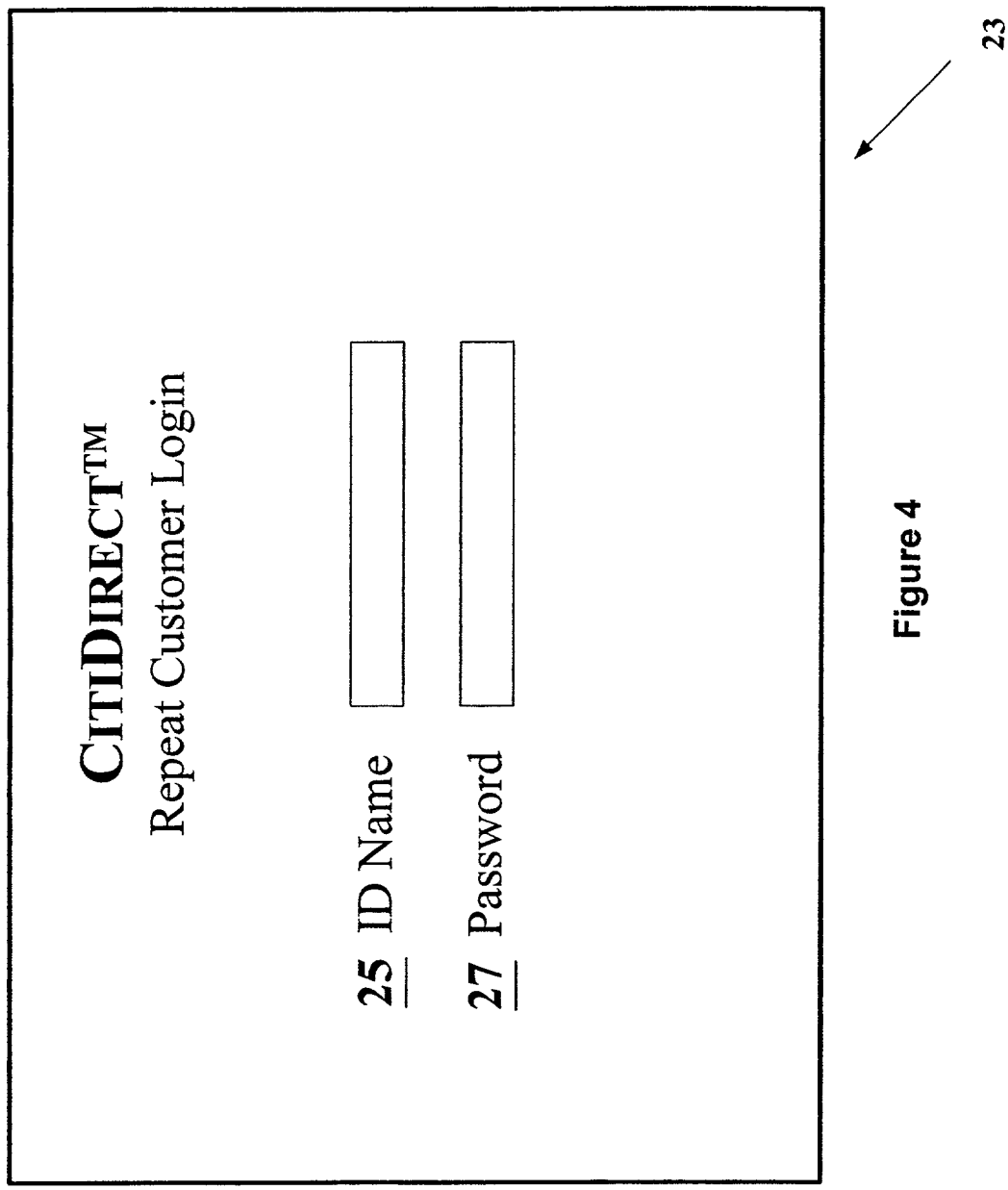
FIG. 4 is a schematic view of a Web page according to an embodiment of the present invention.

Referring to FIG. 2, MCs, NMCs, and CSRs may enter information through Web site 12. In particular, Web site 12 prompts MCs to login by clicking on a first link 11, Web site 12 prompts NMCs to login by clicking on a second link 13 and Web site 12 prompts CSRs to login by clicking on a third link 15. Referring to FIG. 3, by clicking on the first link 11, an MC is linked to the login Web page 17 for MCs, where the MC is directed to a first-time customer login link 19 and a repeat customer login link 21. Referring to FIG. 4, selection of the repeat customer login link 21, results in Web page 23. Web page 23 prompts the MC for an ID name 25 and a PASSWORD 27. MCs ID name 25 and PASSWORD 27 were established during a first-time login sequence, discussed below.

Again, referring to FIG. 3, an MC who is a first-time MC, selects first-time customer login link 19. Referring to FIG. 5, selection of link 19 results in Web page 29 which prompts the first-time MC for various information, including, but not limited to, customer's LAST NAME 31, customer's ACCOUNT NUMBER 33 (e.g., checking, savings with the host), personal identification number ("PIN") 35, customer selected ID name 37, customer selected PASSWORD 39, a repeat of the PASSWORD for verification 41, and customer's E-MAIL ADDRESS 43. Additionally, in an alternative embodiment discussed further below, the first-time customer login page also requests payment information (not shown). At least one embodiment of the present invention contemplates that a MC will have access to more types of notification requests than a NMC, due to the pre-established relationship with the host. As a result of this relationship, the MCs private financial information may be utilized in fulfilling a notification request. As such, at least one alternative embodiment requires a PIN previously generated by the host for the MC, which adds a level of protection to the private financial information (e.g., account numbers).

Further alternative embodiments require that the MC pay a host-determined fee depending on various factors, such as the number of notification requests, the type of notification requests, and/or the MC's current financial relationship with the host. In a particular alternate embodiment, the host requires a minimum cumulative balance of, for example, $10,000.00, including all of the MC's accounts with the host in order to avoid paying a fee for the notification service. In the case where the MC's balance is less than $10,000.00, the host charges the MC a flat monthly fee for using the notification service. These charges are assessed to, for example, the MC's credit card, wherein the MC provides credit card information during the registration process (FIG. 5). One skilled in the art recognizes that alternative fee arrangements fall within the scope of this invention.

Referring to FIG. 6(a), upon successful login by an MC, the MC is linked to MC preference site 70 which utilizes a MiniApp and Transaction Executors. Further, fill-in forms, similar to those used in, for example, the CITIDIRECT® home banking system are used to collect MC data such as content to be notified on 72, preferred channel of contact 74, and a preferred time for notification 76. By way of example, the content to be notified on may include, but is not limited to information relating to the MCs checking, savings and portfolio values, interest rates, stock quotes, credit specials (e.g., special loans, low credit card rates) and other financial specials offered by the host. Specific account-notifications can include, but are not limited to, past-due-date reminders, overdrafts, credit limits, specific credit charges (e.g., single amount charges, location charges), credit fraud warnings (e.g., based on unfamiliar pattern of charges, location of charges, amount of charges) direct deposits (e.g., of salary, dividend, etc.), balance, credit card due dates, automatic bill payments, check clearing alert and ATM withdrawals. The preferred channel of contact may be selected from e-mail, HTML, pager, CSR, mobile phone text messaging, e.g., GSM, XML, facsimile, and SMS. The MC may request to be notified at specific times such as instantaneously (e.g., as soon as technologically possible when the requested event occurs), hourly, daily, weekly, or monthly. In alternative embodiments, the MC is able to select different notification times for different events. After making general notification selections via the MC preference site 70, the MC is linked to other Web pages (not shown) via the "CONTINUE" icon where they are able to provide more specific request information (e.g. phone #, fax #, requested interest rate, requested account balance information, etc. . . . ). The Transaction Executors have direct access to the internal databases and servers of the host (e.g. CITIGOLD® server), subject of course to Database Access Security server restrictions (discussed below). MCs have more options to select from, which are not available to NMCs, through MC preference site 70. Further, the MC preference site 70 is capable of generating reports 78.

Referring to FIG. 6(b), in an embodiment of the present invention, when the MC clicks on the "CREATE REPORT" link 78, the MC is directed to a separate "Report Parameters" Web page 200 for defining report parameters. The "Report Parameters" Web page 200 facilitates user-defined reports 205, where the MC has the ability to define what type of report the MC would like to have created from the information contained in the notification system, as well as predetermined parameter reports 210. Predetermined parameter reports 210 include, for example, today, daily, weekly, monthly notification reports which list all notifications sent during the current day for today and the immediate preceding specified time frame e.g., preceding day, preceding week, preceding month for daily, weekly, and monthly notification reports. Further, the predetermined parameter reports 210 show all methods by which the notifications were sent as well as a summary of the notification, e.g., "$1,000 deposited into account no. XYZ on MM/DD/YY." User-defined reports 205 allow the user to specify parameters used to create the report from specific dates and date ranges to specific accounts, to specific notification methods through which the specified notifications were sent. Once the MC selects their desired report parameters or predetermined parameter report, clicking on the "GENERATE REPORT" button 215 results in a report which includes the desired parameters.

Figure 7:
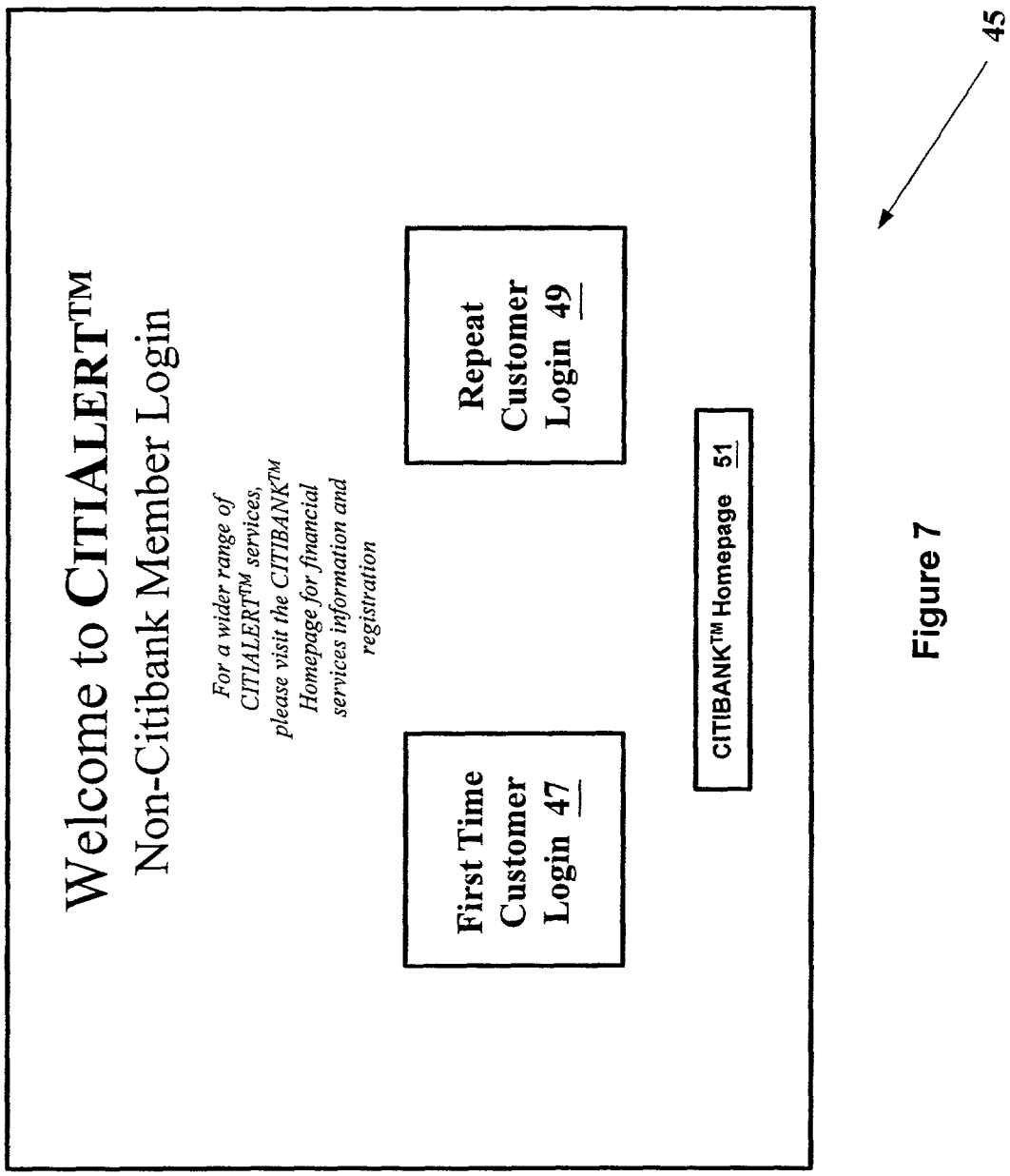
FIG. 7 is a schematic view of a Web page according to an embodiment of the present invention.
Figure 8:
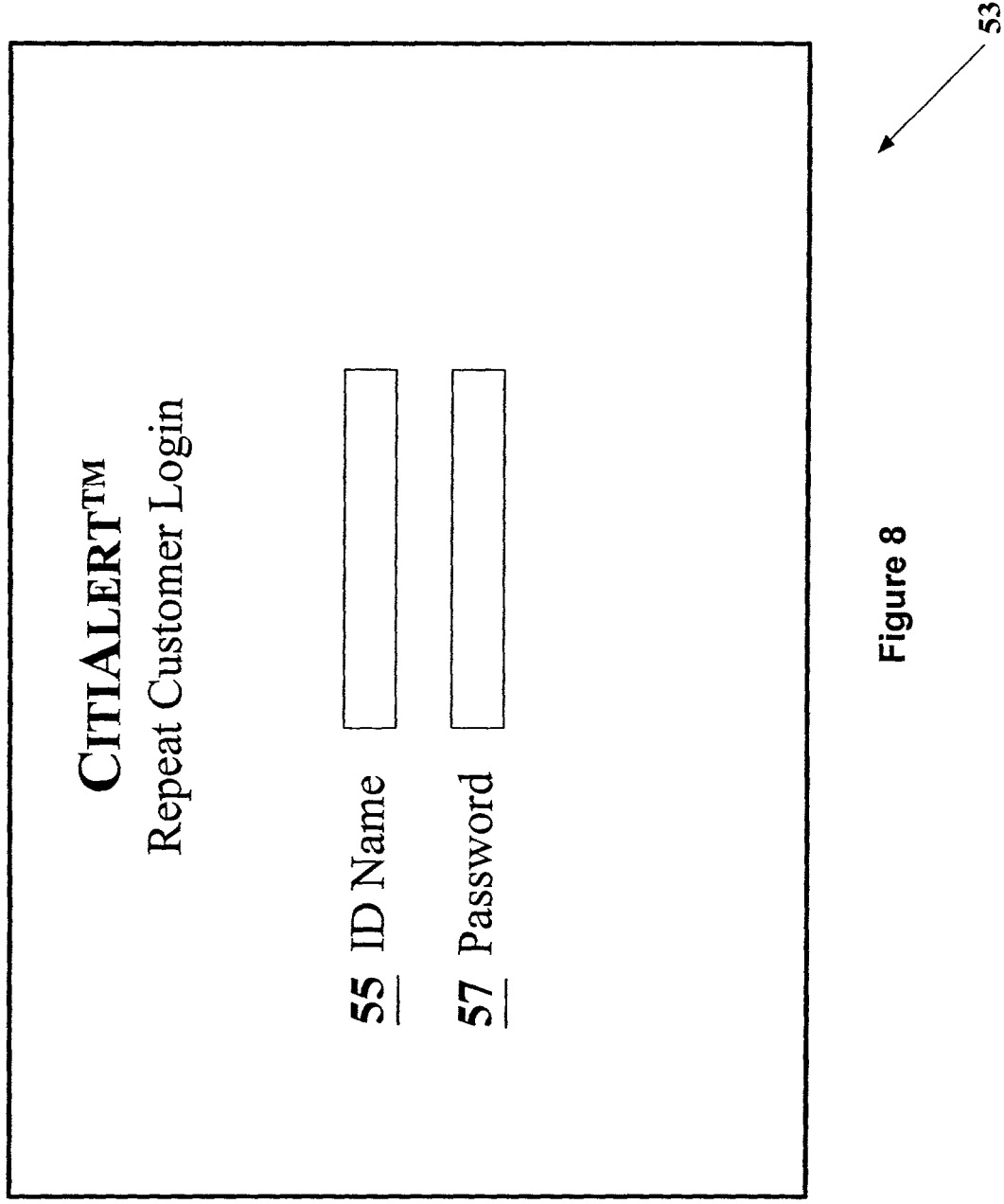
FIG. 8 is a schematic view of a Web page according to an embodiment of the present invention.

In an embodiment where a NMC enters the initial Web site 12, the NMC selects link 13 which, referring to FIG. 7, links the NMC to the NMC login Web page 45 which prompts the NMC to select between a first time customer login link 47 and a repeat customer login link 49. Additionally, Web page 45 may offer a link to the host's homepage 51, in order to familiarize the NMC with the other services offered by the host, with a reminder that the notification system offers a wider range of services to MCs. Selection of repeat customer login link 49 links the NMC to the repeat customer login Web page 53, as show in FIG. 8, where the NMC is prompted to enter previously selected ID name 55 and PASSWORD 57.

Alternatively, referring to FIG. 9, when the NMC selects the first-time customer login link 47, the NMC is linked to the first-time customer login Web page 59, where the NMC is prompted to enter some or all of the following information including customer's FULL NAME 61, customer's selected ID Name 63, customer's selected PASSWORD 65, repeat of PASSWORD for verification 67, and customer's E-MAIL ADDRESS 69. Referring to FIG. 10, upon successful login, the NMC is linked to a stateless NMC preference site 80 which uses an HTML form to collect customer data such as content to be notified on 82, preferred channel of contact 84, and preferred time for notification 86. By way of example, the content to be notified on may include, but is not limited to information relating to interest rates, mortgage rates, stock quotes, credit specials (e.g., special loans, low credit card rates) and other financial specials offered by the host. The preferred channels of contact 84 and the preferred times for notification 86 are similar to those listed with reference to 74 and 76. After making general notification selections via the NMC preference site 80, the NMC is linked to other Web pages (not shown) via the "CONTINUE" icon where they are able to provide more specific request information (e.g. phone #, fax #, requested interest rate). This NMC preference site 80 does not generate any reports and financial account information is not accessible through this site. In an alternative embodiment, prior to gaining access to the NMC preference site 80, the NMC is required to provide payment information in order for the host to charge the NMC for the notification service. In this embodiment, the NMC provides, e.g., credit card and billing information to the host. The host establishes a desired method and time for payment, e.g., flat monthly fee, fee based on number of alerts, fee based on type of alerts (see below).

In a further alternative embodiment, the host provides the NMC with the same alerts that are provided to the MC. In this alternative embodiment, the host uses either pre-established lines of communication, such as ATM lines, credit authorization lines, settlement lines (e.g., Automated Clearing House) and/or specifically negotiated and established lines of communication, in order to obtain the NMC's financial information from the NMC's financial institution. Referring to FIG. 1, the NMC's financial information is obtained through external sources 28 and stored in the rates and information database 30. For example, a customer with a single checking account at Chase Manhattan signs onto the notification system hosted by CITIBANK and requests that the notification system alert the customer via SMS instantaneously when the customer's checking account balance is below $1,000.00. In this alternative embodiment, the NMC is provided with some or all of the notification options that are available to the MCs. In order to provide this alert, CITIBANK cannot use its internal sources. Consequently, referring to FIG. 10, when the customer selects the "CONTINUE" button, the customer will be queried for all identifying information necessary to complete the alert. In this example, the customer supplies information that identifies the customer and the customer's account to Chase Manhattan so that Chase Manhattan can release the customer's information to CITIBANK. This information includes, for example, the customer's CIN, the customer's checking account information, including account number, as well as Chase Manhattan's identifying information, such as bank routing number or bank identification number ("BIN"). Using this identifying information, CITIBANK establishes a standing request to Chase Manhattan to send the customer's checking account to CITIBANK whenever there is a change in, for example, the amount in the customer's checking account. When the updated checking account information is received at CITIBANK, the updated checking account information, e.g., balance, is compared to the customer's request and if the balance is below $1,000.00, the CITIBANK notification system formulates a notification message and sends the message to the customer using SMS. If the balance is at or above $1,000.00, no message is formulated and the notification system waits for the next update.

As with the MCs and the NMCs login, the CSRs are also able to access the notification system through the Web site 12. A CSR selects the CSR login link 15 on Web site 12. CSR login link 15 links the CSR to login Web page 71, wherein the CSR is prompted to enter identification information, such as CSR Name 73 and CSR NUMBER 75, as shown in FIG. 11. Unlike the login choices presented to the MCs and the NMCs in FIGS. 3 and 6, the CSR is not offered a first-time login link. The CSR must already have been assigned the appropriate identifiers prior to entering the login Web page in order to successfully login to the notification system 10.

Referring to FIG. 12, upon successful login, CSRs are linked to a CSR preference site 90, where the CSR is able to create customer requests 92 and set notification channel options 94 and notification time options 98 on behalf of the customers, e.g., MCs and NMCs. CSRs enter the customer's Customer Identification Number (CIN) 96 in order to access previously entered customer information files or to create new files under this CIN. By way of example, the content to be notified on may include, but is not limited to information relating to the MCs checking, savings and portfolio values, interest rates, stock quotes, credit care charges (e.g., over a specified amount, made in a specified geographic region, made in a specific retail store) automatic bill payments (e.g., car loan, mortgage, school loans, telephone, utilities, insurance, and the like), ATM withdrawals, credit specials (e.g., special loans, low credit card rates) and other financial specials offered by the host. After making general notification selections via the CSR preference site 90, the CSR is linked to other Web pages (not shown) via the "CONTINUE" icon where they are able to provide more specific request information (e.g. phone #, fax #, alert customer when home mortgage rates reach X %).

Figure 13:
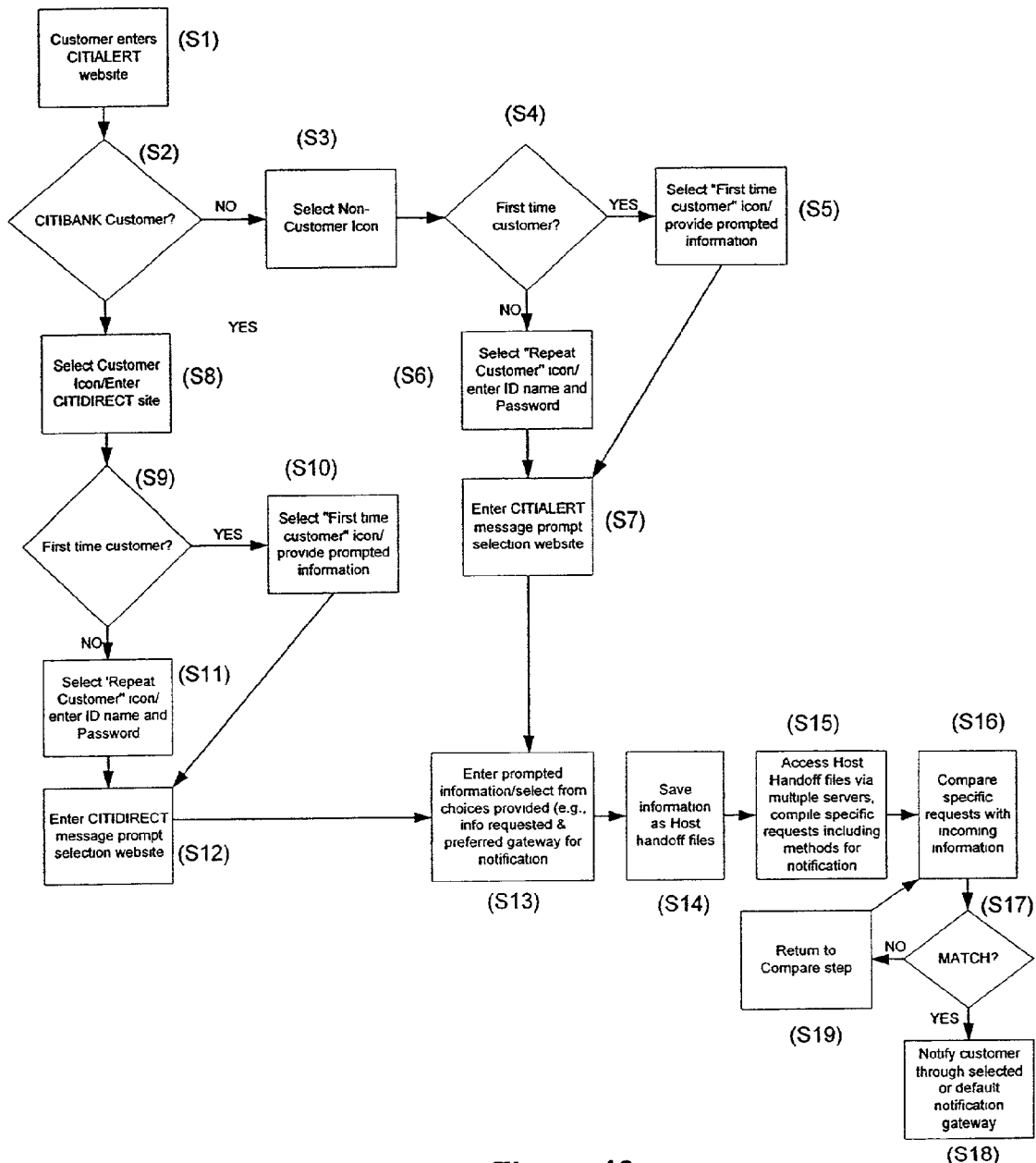
FIG. 13 is a flowchart illustrating a typical process flow when using a notification system according to an embodiment of the present invention.

By way of example, in FIG. 13 a method of practicing the invention begins with a customer entering an initial Web site (e.g., CITIALERT™ Web site) maintained by the host (e.g., CITIBANK™) (S1). The Web site prompts the customer to select the icon which reflects the customer's status as either a MC or a NMC (S2). If the customer selects the NMC icon, the NMC is linked to the NMC login Web page (S3). The NMC login Web page queries the NMC as to whether or not this is their first login attempt (S4). If this is the NMCs first login attempt, the NMC selects the appropriate icon, is linked to the first-time login Web page, and provides the requisite information (S5). Assuming the NMC has logged in at some previous time, the NMC selects the repeat customer icon and enters the appropriate ID Name and PASSWORD (S6). After logging in, the NMC is directed to the stateless NMC preference site where the NMC is prompted to select message and notification information (S7).

If in response to (S2) the customer selects the MC icon, the MC is linked to the MC login Web page (S8). The MC login Web page queries the MC as to whether or not this is their first login attempt (S9). If this is the MCs first login attempt, the MC selects the appropriate icon, is linked to the first-time login Web page, and provides the requisite information (S10). Assuming the MC has logged in at some previous time, the MC selects the repeat customer icon and enters the appropriate ID Name and PASSWORD (S11). After logging in, the MC is directed to the MC preference site (e.g., CITIDIRECT® site) where the MC is prompted to select message and notification information (S12).

Within both the NMC preference site 80 and the MC preference site 70, respectively, the customers are prompted to choose and provide information relating to a message they would like to receive and also to select the notification alert message gateway 40 through which they would like to be alerted of the message (S13). This information is saved by the notification system 10 within the host-handoff files 16, (S14). The host-handoff files 16 are accessed by multiple servers (see FIG. 1) and data therefrom is compiled into specific request and notification files (S15). The specific requests are compared to continuously incoming information from internal and external sources (S16). The notification system 10 ascertains if there is a match (S17). If there is a match, the customer is notified according to the customer's request, through the customer's selected gateway (S18). If there is no match, the request is compared to the next bit of incoming information (S19), until the request is fulfilled.

The notification system 10 described above is capable of alerting customers in multiple transaction areas. In embodiments of the present invention, MCs enjoy a wider range of possible notification scenarios, due to their financial relationship with the host. For example, MCs may be alerted as to account balances, CD maturation, credit card payment being due, a check has bounced, foreign or domestic exchange has hit a target price, foreign exchange rates, domestic interest rates, etc. Either the MC or a CSR would enter the appropriate preference cite and proceed to enter the request. In an alternative embodiment, if the MC has a broker relationship with the host, an embodiment of the present invention contemplates a multiple alert scenario, wherein, for example, the MC requests notification when a particular stock hits a specified value. This is the first alert. The MC further instructs the host broker at the time of establishing the first alert, to buy X shares of the stock, using funds from a specified account, when the stock value reaches this specified value. The host broker sends a second alert notifying the MC that the transaction has been completed. Alternatively, after sending the first alert, instead if purchasing the stock automatically, the host broker is instructed by the MC to wait for a reply message from the MC prior to purchasing the stock. Although more restricted in the types of alerts that they may receive in certain embodiments, NMCs may still be alerted regarding for example, interest rates and stock prices.

In various embodiments of the present invention all of the customers of the notification system 10 create their own login IDs and PASSWORDS through a web application interface in order to access the notification system 10 via the Internet. Customer login IDs and PASSWORDS are subject to creation business rules and are checked for uniqueness. The web application login IDs are independent of any host ID such as host account numbers, or CINs in the case of MCs. The PASS- WORDS are kept in encrypted format. In the case of NMCs, the ID and PASSWORD may only grant them limited access to the notification system 10. In alternative embodiments, the MCs may have access to other levels or databases within the notification system due to their membership status. In order to access these databases, in addition to their self-created IDs and PASSWORDS, MCs are prompted to enter additional identifying information such as, account numbers or CINs.

In various preferred embodiments of the present invention, once the customers have created IDs and PASSWORDS, the notification system 10 offers multiple avenues for alerting or notifying the customers of financial opportunities to which they might wish to avail themselves. Referred to herein as alert message gateways 40, these include but are not limited to electronic mail ("E-mail") 42, mobile phone text messaging, e.g., Global System for Mobile Communications Service ("GSM") 50, facsimile ("Fax") 54, extensible mark-up language ("XML") 52, hypertext mark-up language ("HTML") 44, pager service 46, and short message service ("SMS") 56. Additionally, personal contact methods may also be chosen, such as person-to-person calls with CSRs 48. In the event that a particular notification gateway 40 is not specifically selected, an embodiment of the present invention provides a default notification gateway, for example, the customer's e-mail address. In this embodiment, the e-mail address of the customer would be a required field that must be completed prior to enrollment into the notification system.

In various embodiments of the present invention, customers access the notification system 10 for any of a variety of reasons. Customers may choose to access the notification system 10 in order to add new or updated information to one or more of the available databases. In particular, customers may wish to choose or change their preferences for when and how they wish to be notified of transaction opportunities. Further, customer's may wish to check a log or report of the most recent notifications that they have received. For example, an embodiment of the present invention allows customers to check a report containing the last X (X=1, 2, 3 ... n) notifications of which the customer was alerted via their chosen notification gateway 40. Further as discussed with reference to FIG. 6(*b*), the report may contain a more detailed account of the substance of the notification for the customer to review prior to acting or not acting based on the information contained in the notification.

Embodiments of the present invention allow host personnel or CSRs to access the notification system 10, in addition to customers accessing the notification system. CSRs, including host telephone operators, are able to create or update customer records through, for example, a web application interface. These additions or updates may be added in response to a customer call, either after the call or simultaneous therewith. In an alternative embodiment, the CSR accesses the notification system 10 to enter customer record information that has been collected from other off-line sources, such as from customer paperwork that has been completed by the customer for host service enrollment, e.g. opening new accounts, applying for loans, etc. As previously discussed, the CSR's also have IDs and PASSWORDS to ensure the security of the customer records. Further, the embodiments of the present invention contemplate that the CSR web application interface be only available to CSRs.

In addition to adding or updating customer records directly into the Web site, an alternative embodiment enables the CSRs to access particular feeder databases or servers which are not part of the immediate Web site databases/servers and enter data thereto for later addition to the Web site databases/servers. In this embodiment, the files from the off-site databases or servers (hereafter "feeder servers") are fed into the Web site databases/servers in response to an established execution program. These feeder servers are as numerous as is necessary in order to efficiently and accurately supply customer and other relevant information to the Web site databases/servers. The possible configurations are too numerous to mention but one skilled in the art will recognize the many variations which flow from the following embodiments.

The alert message text database 26 contains the notification requests based on the specified customer preferences. In addition to the substantive requests (e.g., notify me when each share of Microsoft® is $150) each request record stored in the alert message text database 26 indicates the customer's preferred notification channel (e.g., page me with the notification at the following number (zzz-zzz-zzzz). This database utilizes information gathered through the customer preference databases 24. The formatted requests held in the alert message text database 26 are accessed and searched during the running of the execution program (e.g., CITIALERT™ software program), using information from the host handoff files as well as the rate and information databases. If an alert condition has been satisfied based on the up-to-date information, the alert message text database 26 initiates the procedure for notifying the customer that the request has been met. The following tables represent various schema followed for accessing and utilizing information from the alert message text database 26.

The feeder servers, as well as the Web site databases/servers may be separated, depending on design parameters and the type of notification scenarios envisioned, into various types of categories. For example, the Web site databases/servers might include as shown in FIG. 1, customer preference database 24, rates and information database 30, alert message text database 26, access database (not shown), and finally host-handoff files 16. These lists of category types are not meant to be limiting, they are merely exemplary.

In an embodiment of the present invention, the customer preference database 24 contains information about the customer, customer preference information, CSR information, notification method information, rates and information data, including prompt and response data, and display group information. Each type of information is represented in schema tables, such as those printed and described further with reference thereto below. The particular schema tables set forth below are merely exemplary and may include more or less information as determined by one skilled in the art for the type of notification system that is envisioned.

In certain embodiments of the present invention, the customer preference database 24 contains multiple data tables for storing and correctly logging in required data into the requisite datafields. In these certain embodiments, the customer preference database 24 is accessed and information is entered thereto by multiple entities, for multiple purposes. The following tables provide exemplary data schema formats for data storage within the customer preference database 24.

Referring to TABLE 1, the exemplary "Customer from Customer Preferences Database" table includes, for example, an unique customer identifier used internally by the host, customer name, contact information (e.g., phone/fax number(s), e-mail address, GSM or other mobile phone text messaging numbers), CSR ID, customer type/host affiliation (e.g., MC or NMC), password(s), and login ID. The customer preference database retains all passwords, including customer passwords, in encrypted format. TABLE 1 contains a default notification method data field which ranks a customer's preference for notification methods, e.g., e-mail first, GSM second, facsimile third, in addition to data fields containing: the date for the last time a modification was made to a particular customer's notification record; an activation flag for indicating whether a message is to be sent for a particular notification subscription or not e.g., messages resulting from a particular notification subscription are held in queue; and an authentication cookie generated each time a customer retrieves their record to be updated.

TABLE 1

Customer from Customer Preference Database

| Name | Type | Length | Description |
|---|---|---|---|
| CustomerId | Int | 4 | Internally generated Unique identifier of the record. (Primary key) |
| CustomerType | Char | 1 | "C" for CITIDIRECT or CITIGOLD customers "0" for non-Host customers |
| LoginId | Char | 22 | User created login ID for non-CITIDIRECT customers. Customer Identification Number (CIN) for CITIDIRECT customers. |
| Password | Char | 10 | User created password for non-CITIDIRECT customers. Not used for CITIDIRECT customers |
| Name | Char | 60 | Customer first name, last name and title |
| Email | Char | 50 | E-mail address to receive alerts |
| GSMNumber | Char | 20 | GSM phone number to receive alerts |
| FaxNumber | Char | 20 | Fax number to receive alerts |
| DefaultNotification Method | Char | 1 | "1" for E-mail "2" for GSM "3" for FAX |
| LastModifiedDate | Time Stamp | 8 | Date when the Customer record was last updated. |
| CSRId | Int | 4 | Reference to CSRs table. Customer's Account representative. |
| DayPhone | Char | 20 | Customer's day time phone number |
| EveningPhone | Char | 20 | Customer's evening time phone number |
| ActivationFlag | Char | 1 | "Y" means alert messages will be generated for this subscription and Customer's will see this prompt on their screen. "N" means alert messages will not be generated for this subscription and Customer's will not see this prompt on their screen. This flag is used when the customer does not want to receive alerts yet he/she does not want to clear the current alert settings. |
| AuthCookie | Char | 40 | It's an application cookie generated each time customer fetches his/her record for update. This value is compared upon form submit. |

Referring to TABLE 2, the exemplary "Customer Request from Customer Preferences Database" table includes: customer ID (described above); identification of the processor type, e.g., rates and information or host type; reference ID, e.g., the alert to which the customer has subscribed which is dependent upon processor type; threshold flag; threshold value; notification method; notification limit; last notification date; and CIN for MCs, e.g., used to access MC information from host database. Customer requests are separated through this table according to the whether the customer's request requires that the internal host databases be accessed to fulfill the request, e.g., for various MC requests involving an MC's account(s) with the host, or requires that external databases be accessed to fulfill the request. This table includes a threshold flag data field for indicating whether a particular updated value is the same, greater, or lesser than a customer indicated threshold value (e.g., interest rates, stock quotes). The notification limit data field holds an indicator for how often or how many times a customer chooses to be notified of the same alert, e.g., no limit, no alert, a specified number.

TABLE 2

Customer Requests from Customer Preference Database

| Name | Type | Length | Description |
|---|---|---|---|
| CustomerId | Int | 4 | Reference to a Customer record. (Primary key part 1 of 3) |
| Processor Type | Char | 1 | "1" for Rates and Info type "2" for Host type This field is required since the public information and data obtained from the host are in different database. (Primary key part 2 of 3) |
| ReferenceId | Int | 4 | This field is used to identify which alert the customer is subscribing to. Reference to a RatesAndInforPrompts record when ProcessorType is "1" Reference to a HostInfoPrompts record when ProcessorType is "2" (Primary key part 3 of 3) |
| ThresholdFlag | Char | 1 | For Rate type alerts it indicates the comparison mode of the current rate and the customer indicated threshold value. "0" for any change "1" if current rate is greater then threshold value "2" if current rate is less then threshold value |
| ThresholdValue | Float | 8 | For Rate type alerts it is the customer target value |
| Notification Method | Char | 1 | The notification method for this alert. "0" use customer's default notification method "1" for E-mail "2" for GSM "3" for FAX |
| Notification Limit | Int | 4 | Number of times to be notified. "−1" for No limit. "0" for no alerts will be generated A Positive number will generate an alert and the number will be decremented automatically. |
| LastNotification Date | Time Stamp | 8 | Last time an alert was generated. This field is used by the Alert Message generator's to avoid sending duplicate messages. |
| CIN | Char | 22 | Customer Identification Number (CIN) for CITIDIRECT customers. This field is duplicated here for performance optimization (In ideal DB design this field should be obtained from Customers table Login field. |

Referring to TABLE 3, the exemplary "Customer Service Representative from Customer Preferences Database" table includes CSR ID which is an internally generated identifier unique to each CSR, name, phone number, e-mail, and a CSR manager's ID, which is the identifier for the CSR's manager.

TABLE 3

Customer Service Representative from Customer Preference Database

| Name | Type | Length | Description |
|---|---|---|---|
| CSRId | Int | 4 | Internally generated Unique identifier of the record. (Primary key) |
| Name | Char | 60 | Customer Representative first name, last name and title |
| Email | Char | 50 | E-mail address to receive copy of the alerts sent to the their customers. |
| Phone | Char | 20 | Phone number |
| ManagerId | Int | 4 | Reference to a another CSR record which represents this CSR's manager |

Referring to TABLE 4, the exemplary "Notification Methods from Customer Preferences Database" table includes the data fields for the type of notification methods that are available and the specifications for the text that appears for the heading of each notification method.

TABLE 4

Notification Methods from Customer Preference Database

| Name | Type | Length | Description |
|---|---|---|---|
| NotificationMethod | Char | 1 | "1" for E-mail<br>"2" for GSM<br>"3" for FAX |
| Heading | Char | 20 | The textual phrase appearing on different screens (Web sites). |

Referring to TABLE 5, the exemplary "Rates and Information Prompts from Customer Preferences Database" table includes data fields for: an unique internal identifier for a particular rates and information prompt; a display group identifier; the display order; rates and information types; prompt text; CSR notification; activation flag; start date; expiration date; current rate; last update date; and automatic feed identifier.

The display group identifier identifies the particular group of prompts to which this particular prompt belongs. Exemplary display groups include, for example, auto loans, Certificate of Deposit ("CD") rates, mortgage rates, stock quotes, credit card rates, etc. The display order data field determines the order in which a particular prompt appears on the customer's notification screen. The rates and information type data field reflects whether the prompt is directed toward product information only or product information with the associated rates. For example, product information only is a list of available mortgage loans such as 30-year fixed, 30-year variable, 15-year fixed, and 15-year variable, while product information with associated rates would include the types of mortgage loans plus the current interest rates for each. The prompt data field dictates the format, e.g., length, type of the notification textual phrase. The CSR notification data field dictates whether or not the customer chooses to have a CSR be copied on an alert. CSR notification may be desirable, for example, where the customer desires that he be notified of alerts by a CSR directly. The start, expiration, and last update date data fields indicate the date on which the notification system should begin generating appropriate alert messages, the date after which the system will no longer generate alert messages, and the date on which the current rate and info prompt record was updated, respectfully. The current rate data field contains the current rate, e.g., interest rate, against which a customer's threshold rate is compared. Finally, the auto feed identifier data field is used by the feeder applications (discussed above) to identify matching records during the process of importing rates and information from sources.

TABLE 5

Rates and Information Prompts from Customer Preference Database

| Name | Type | Length | Description |
|---|---|---|---|
| RatesAndInfoPromptId | Int | 4 | Internally generated Unique identifier of the record. (Primary key) |
| DisplayGroupId | Int | 4 | Reference to DisplayGroups record which represents this Product Prompt grouping such as "Auto loans" or "30 day CD rates" |
| DisplayOrder | Int | 4 | The order in which this prompt will appear on the Customer's screen within the DisplayGroup. |
| RatesAndInfoType | Char | 1 | "I" for Product information only types<br>"R" for Product information with associated rate |
| Prompt | Char | 100 | The textual phrase appearing on the different screen (Web sites) describing the alert. |
| NotifyCSR | Char | 1 | "Y" means when a message is sent to the customer then a copy will also be sent to the customer's CSR.<br>"N" means do not send a copy to CSR. |
| Activation Flag | Char | 1 | "Y" means alert messages will be generated for this subscription and Customer's will see this prompt on their screen.<br>"N" means alert messages will not be generated for this subscription and Customer's will not see this prompt on their screen.<br>This flag is used when the prompt is under construction or it is in the approval phrase. |
| StartDate | Time Stamp | 8 | The date from which the system will generate alert messages. This field has no effect on Customer screens, which means that if the Activation Flag is "Y" then this prompt will appear on the Customer screen regardless of the StartDate field value. |
| Expiration Date | Time Stamp | 8 | The date after which the system will not generate alert messages. This field has no effect on Customer screens, which means that if the ActivationFlag is "Y" then this prompt will appear on the Customer screen regardless of the Expiration Date field value. |
| CurrentRate | Float | 8 | The current rate to which Customer threshold targets are compared against. This field is valid only if the RatesAndInfoType is "R". |
| LastUpdate Date | Time Stamp | 8 | Last time this record or its corresponding response was updated. This field is used by the Alert Message generator's to avoid sending duplicate messages. |
| AutoFeedId | Char | 10 | This field is used by Feeder applications to identify matching records during import process. |

Referring to TABLE 6, the exemplary "Rates and Information Responses from Customer Preference Database" table includes data fields for: an unique internal identifier for a particular rates and information response; the corresponding unique internal identifier for the particular rates and information prompt; notification method; subject; response detail; and activation flag.

The "Rates and Information Responses from Customer Preference Database" details the corresponding response information for the "Rates and Information Prompts from Customer Preference Database." Consequently, the responses are assigned an identifier that is linked to the prompt identifier representing the prompt to which it is responding. The subject data field dictates the textual phrase that appears in the response message heading, e.g., such as the subject line in a standard e-mail message. The response detail data field dictates the textual phrase that appears in the body of the response message, e.g., such as the body of a standard e-mail message.

TABLE 6

Rates and Information Responses from Customer Preference Database

| Name | Type | Length | Description |
|---|---|---|---|
| RatesAndInfo ResponseId | Int | 4 | Internally generated Unique identifier of the record. (Primary key) |
| RatesAndInfo PromptId | Int | 4 | Reference to a RateAndInfoPrompts record which represents the prompt (question) to this response. |
| Notification Method | Char | 1 | "0" for default response for all methods "1" for E-mail "2" for GSM "3" for FAX |
| Subject | Char | 100 | The textual phrase appearing on the Response message heading. This is the same as standard E-mail subject text. |
| Response Detail | Var Char | 1024 | The textual phrase appearing on the Response message body. This is the same as standard E-mail body text. |
| Activation Flag | Char | 1 | "Y" means this response is ready to be sent to customers. "N" means this response is not ready to be sent to customers.. This flag is used when the response is under construction or it is in the approval phrase. |

Referring to TABLE 7, the exemplary "Display Groups from Customer Preference Database" table includes data fields for: a display group identifier; heading; source database; and the display order. The source database indicates the database which stores the display groups, e.g., the customer preference database.

TABLE 7

Display Groups from Customer Preference Database

| Name | Type | Length | Description |
|---|---|---|---|
| Display GroupId | Int | 4 | Internally generated Unique identifier of the record. (Primary key) |
| Heading | Char | 80 | The textual phrase appearing on different screens (Web sites). This field represents the Product grouping such as "Auto loans" or "30 day CD rates". |
| SourceDB | Int | 4 | "1" for Customer Preference Database |
| DisplayOrder | Int | 4 | The order in which this product grouping will appear on the Customer's screen. |

In an embodiment of the present invention, the rates and information database 30 contains promotional content such as current rates and upcoming specials. This database keeps generic notification options available to all customers. This database can also be used to broadcast critical messages to selected customers. For example, if a customer has indicated a specific price at which the customer wishes to purchase a specified amount of stock or has requested notification in the event of a particular amount of variation in a foreign exchange rate, the rates and information database contains this type of information.

In an embodiment of the present invention, the alert message text database 26 is used to keep the content of the text of the alert messages (provided by the host handoff files database 16) in an efficient format. Only the latest handoff file content is retained in the alert message text database 26.

Referring to TABLE 8, the exemplary "Host Information Prompts from Alert Message Text Database" table includes data fields for: an unique internal identifier for a particular host information prompt; a display group identifier; the display order; prompt text; CSR notification; activation flag; start date; expiration date; message code; last update date; and automatic feed identifier.

The majority of the data fields from TABLE 8 are described with reference to at least TABLE 5. Additionally, the message code is an action code that is set by the host and represents the host identified event which the customer has selected for alert purposes. This message code is used by the alert message generator to map host event records to host information prompt records.

TABLE 8

Host Information Prompts from Alert Message Text Database

| Name | Type | Length | Description |
|---|---|---|---|
| HostInfo PromptId | Int | 4 | Internally generated Unique identifier of the record. (Primary key) |
| Display GroupId | Int | 4 | Reference to DisplayGroups record which represents this Product Prompt grouping such as "Checking accounts" or "Money Market Accounts" |
| DisplayOrder | Int | 4 | The order in which this prompt will appear on the Customer's screen within the DisplayGroup. |
| Prompt | Char | 100 | The textual phrase appearing on the different screen (Web sites) describing the alert. |
| NotifyCSR | Char | 1 | "Y" means when a message is sent to the customer then a copy will also be sent to the customer's CSR. "N" means do not send a copy to CSR. |
| Activation Flag | Char | 1 | "Y" means alert messages will be generated for this subscription and Customer's will see this prompt on their screen. "N" means alert messages will not be generated for this subscription and Customer's will not see this prompt on their screen. This flag is used when the prompt is under construction or it is in the approval phrase. |
| StartDate | Time Stamp | 8 | The date from which the system will generate alert messages. This field has no effect on Customer screens, which means that if the Activation Flag is "Y" then this prompt will appear on the Customer screen regardless of the StartDate field value. |
| ExpirationDate | Time Stamp | 8 | The date after which the system will not generate alert messages. This field has no effect on Customer screens, which means that if the ActivationFlag is "Y" then this prompt will appear on the Customer screen regardless of the Expiration Date field value. |
| MessageCode | Float | 8 | The action code set by the Host, which represents this event. For example "11111" means overdraft. The Message code is used by the host alert message generator to map a HostEvent record to HostInfoPrompt record. |

TABLE 8-continued

Host Information Prompts from Alert Message Text Database

| Name | Type | Length | Description |
|---|---|---|---|
| LastUpdate Date | Time Stamp | 8 | Last time this record or its corresponding response was updated. This field is used by the Alert Message generator's to avoid sending duplicate messages. |
| AutoFeedId | Char | 10 | This field is used by Feeder applications to identify matching records during import process. |

Referring to TABLE 9, the exemplary "Host Information Responses from Alert Message Text Database" table includes data fields for: an unique internal identifier for a particular rates and information response; the corresponding unique internal identifier for the particular rates and information prompt; notification method; subject; response detail; and activation flag. The description of these data fields is found with reference to TABLE 6.

TABLE 9

Host Information Responses from Alert Message Text Database

| Name | Type | Length | Description |
|---|---|---|---|
| HostInfo ResponseId | Int | 4 | Internally generated Unique identifier of the record. (Primary key) |
| HostInfo PromptId | Int | 4 | Reference to a HostInfoPrompts record which represents the prompt (question) to this response. |
| Notification Method | Char | 1 | "0" for default response for all methods "1" for E-mail "2" for GSM "3" for FAX |
| Subject | Char | 100 | The textual phrase appearing on the Response message heading. This is the same as standard E-mail subject text. |
| ResponseDetail | Char | 1024 | The textual phrase appearing on the Response message body. This is the same as standard E-mail body text. |
| Activation Flag | Char | 1 | "Y" means this response is ready to be sent to customers. "N" means this response is not ready to be sent to customers.. This flag is used when the response is under construction or it is in the approval phrase. |

Referring to TABLE 10, the exemplary "Host Event From Alert Message Text Database" table includes data fields for: an unique identifier for identifying a host event; account number; product type code; sub product code; currency code; CIN; message code; current value; as of date; last update date; and notes.

In addition to previously defined data fields, further data fields defined through TABLE 10 include identifiers for identifying a customer through the customer's relationship with the host. For example, account number, product type, sub product type, and currency code represent four (4) data fields that link a customer to the host. In a particular exemplary embodiment, a customer has a checking account, e.g., account number, with the host as well as a car loan, e.g., product type, wherein the car loan is a 5 year loan at an 8.0% fixed interest rate, e.g., sub product type, calculated in U.S. dollars, e.g., currency. The notes and as of date data fields are for information which is only merged with the response detail or the message text when messages are sent to the customers. For example, the notes data field is used to send account specific information such as current balance.

TABLE 10

Host Event From Alert Message Text Database

| Name | Type | Length | Description |
|---|---|---|---|
| HostEventId | Int | 4 | Internally generated Unique identifier of the record. (Primary key) |
| Account Number | Char | 22 | Account number. Part 1 of 4 to uniquely identify a relationship with Host. |
| ProductType Code | Char | 3 | Product type. Part 2 of 4 to uniquely identify a relationship with Host. |
| SubProduct TypeCode | Char | 2 | Sub product type. Part 3 of 4 to uniquely identify a relationship with Host. |
| CurrencyCode | Char | 3 | Currency Code. Part 4 of 4 to uniquely identify a relationship with Host. |
| CIN | Char | 22 | Customer Identification Number. This field is used to identify the specific Customer request record. |
| MessageCode | Float | 8 | The action code set by the Host, which represents this event. For example "11111" means overdraft. The Message code is used by the host alert message generator to map a HostEvent record to HostInfoPrompt record. |
| CurrentValue | Float | 8 | The current value to which Customer threshold targets are compared against. For example if a customer wants to be notified if his/her balance is below certain amount. |
| AsOfDate | Time Stamp | 8 | This field is for information only which will be merged with the Response Detail (body) when messages are sent to the customers. |
| LastUpdate Date | Time Stamp | 8 | Last time this record or its corresponding response was updated. This field is used by the Alert Message generator's to avoid sending duplicate messages. |
| Notes | Char | 120 | The textual phrase, which will be merged with the Response Detail (body) when messages are sent to the customers. This field can be used to send account specific data such as current balances. |

Referring to TABLE 11, the exemplary "Display Groups from Alert Message Text Database" table includes data fields for: a display group identifier; heading; source database; and the display order. The source database indicates the database which stores the display groups, e.g., the host handoff database.

TABLE 11

Display Groups from Alert Message Text Database

| Name | Type | Length | Description |
|---|---|---|---|
| DisplayGroupId | Int | 4 | Internally generated Unique identifier of the record. (Primary key) |
| Heading | Char | 80 | The textual phrase appearing on different screens (Web sites). This field represents the Product grouping such as "Checking accounts" or "CDs". |
| SourceDB | Int | 4 | "2" for Host handoff database |
| DisplayOrder | Int | 4 | The order in which this product grouping will appear on the Customer's screen. |

Referring to TABLE 12, the exemplary "Alert Messages from Alert Message Text Database" table includes data fields for: an alert message identifier; customer ID; customer type;

notification method; processor type; reference identifier; create date; sent date; subject; response detail; and CSR notification.

The alert messages are uniquely identified to the database through an identifier. In addition to previously defined data fields, in order to formulate specific alert messages the requesting customer is identified through a customer ID, the customers status as an MC or NMC is identified, the notification method is identified, the processor type is identified, and a reference ID is used to identify which alert the customer has selected. Further, the create and sent dates identify when the alert message was created and sent, respectively.

TABLE 12

Alert Messages from Alert Message Text Database

| Name | Type | Length | Description |
|---|---|---|---|
| AlertMessageId | Int | 4 | Internally generated Unique identifier of the record. (Primary key) |
| CustomerId | Int | 4 | Reference to a Customer record. |
| CustomerType | Char | 1 | "C" for CITIDIRECT or CITIGOLD customers "0" for non-Host customers |
| NotificationMethod | Char | 1 | The notification method for this alert. "0" use customer's default notification method "1" for E-mail "2" for GSM "3" for FAX |
| ProcessorType | Char | 1 | "1" for Rates and Info type "2" for Host type This field is required since the public information and data obtained from the host are in different database. |
| ReferenceId | Int | 4 | This field is used to identify which alert the customer is subscribing to. Reference to a RatesAndInforPrompts record when ProcessorType is "1" Reference to a HostInfoPrompts record when ProcessorType is "2" |
| Createdate | Time Stamp | 8 | Timestamp when this record is created |
| SentDate | Time Stamp | 8 | Timestamp when alert was sent |
| Subject | Char | 100 | The textual phrase appearing on the Response message heading. This is the same as standard E-mail subject text. |
| ResponseDetail | Var Char | 1024 | The textual phrase appearing on the Response message body. This is the same as standard E-mail body text. |
| NotifyCSR | Char | 1 | "Y" means when a message is sent to the customer then a copy will also be sent to the customer's CSR. "N" means do not send a copy to CSR. |

In certain embodiments of the present invention, the access database is used to give database access to all other applications within the notification system.

Referring to TABLE 13, the exemplary "Access from Access Database" table includes data fields for: an access ID; login ID; password; last changes date; connection string; and password change interval. The access database gives a requesting database/server with an appropriate access identifier, the proper database connection string, database login ID, and password for the database that is sought to be accessed. The table also tracks password changes through the last changes date data field and contains the value for the time intervals at which the password is required to be changed for security reasons through the password change interval data field.

TABLE 13

Access from Access Database

| Name | Type | Length | Description |
|---|---|---|---|
| AccessId | Int | 4 | Internally generated Unique identifier of the record. (Primary key) |
| LoginId | Char | 20 | Database login name |
| Password | Char | 20 | Database login password |
| LastChangedDate | Time Stamp | 8 | Last time the Login password was changed |
| ConnectionString | Char | 120 | Database connections string |
| PasswordChangeInterval | Int | 4 | Number of days when a new password should be generated for this login |

In certain embodiments of the present invention, servers are either accessed or perform an accessing function in order to update one or more of the databases described above. In order to provide timely notifications to customers, it is necessary to ascertain and synthesize the most up to date information that is available. As was discussed previously, data may be collected from a variety of different sources and fed into a variety of different databases or files. The term "servers" is a generic term utilized to describe any and all sources of data and information which may be used to update the specific databases described above. These servers could be databases, servers, or direct data links, such as people, entering information in real-time or networks.

The tables and descriptions set forth herein are merely meant to be exemplary embodiments of the present invention and are not intended to be limiting. One skilled in the art recognizes the many variations and embodiments which fall within the scope of the invention.

We claim:

1. A method implemented on a machine for formulating an alert message containing financial information for a customer comprising:
   providing the customer, via a communications platform hosted on one or more servers of a first financial institution connected to a network, with access to a notification system, including,
   (i) providing, by the one or more servers, a first link to a first user interface and a second link to a second user interface that the customer selects depending on whether the customer is a member customer or a non-member customer, wherein the first user interface is for member customers affiliated with a financial institution providing the notification system and the second user interface is for non-member customers who are not affiliated with the financial institution providing the notification system,
   (ii) receiving, by the one or more servers, a selection by the customer of the first link or the second link,
   (iii) generating, by the one or more servers, access data authenticating the customer in response to receiving the selection of the first link or the second link,
   (iv) prompting, by the one or more servers, the customer, via a user interface, for the access data, and
   (v) providing, by the one or more servers, the first or second user interface to the customer depending on the selection, wherein the first user interface provides a set of customer-selectable events that are different than a set of customer-selectable events included in the second user interface;

storing, by the one or more servers, in a machine storage an alert prompt in a first database of a notification system hosted by the first financial institution, wherein the alert prompt includes an indication of a change in value of monitored financial information in account data received from at least one server of a second financial institution detected by at least one server of the first financial server;

receiving, by the one or more servers, from the at least one server of the second financial institution the account data containing the financial information into a second database of the notification system, wherein the incoming account data containing the financial information is received into the second database on the network from the at least one server of the second financial institution and at least one server of the first financial institution, and further wherein the incoming account data containing the financial information received from the at least one server of the first financial server results from a change in at least one customer account maintained by the first financial institution;

comparing the incoming financial information with the indication of the change of the alert prompt in the first database;

transmitting, via the communications platform connected to the network, an alert message to one or more devices of the customer through at least one communications channel associated with the one or more devices in accordance with at least one customer-preferred method for notifying the alert message at a customer-preferred time for notifying the alert message, the alert message transmitted upon the one or more servers determining that the indication of the change match the incoming financial information, wherein the alert message includes a request for a reply message; and upon receiving the reply message from the customer, the one or more servers executing an instruction, wherein the one or more servers execute an action according to the instruction responding to the change in value of the monitored financial information.

2. The method according to claim 1, wherein the first financial institution is hosting the notification system.

3. The method according to claim 1, wherein the second financial institution is accessible over the Internet.

4. The method according to claim 1, wherein the second financial institution is not hosting the notification system.

5. A method implemented on a machine for notifying a customer of at least one requested event comprising:

generating, by one or more servers of a notification system of a first financial institution, a user interface displayed on a user device of the customer, generating the user interface including,
  (i) providing a first link to a first user interface associated with member customers and a second link to a second user interface associated with non-member customers,
  (ii) receiving from a browser of the user device a selection by the customer of the first link or the second link,
  (iii) generating access data for the customer according to the first link or the second link,
  (iv) updating the user interface to include an input prompt prompting the customer, via the user interface, for the access data, and
  (iv) providing the first or second user interface to the customer depending on the selection, wherein the first user interface provides a first set of customer-selectable events that are different than a second set of customer-selectable events included in the second user interface;

prompting the customer via the user interface to select at least one requested event, wherein the at least one requested event instructs the one or more servers of the notification system to monitor account data containing financial information received from at least one server of a second financial institution and indicates a change in value of monitored financial information triggering one or more alert notifications;

prompting the customer via the user interface to select at least one instruction, the at least one instruction configuring at least one server of the first financial institution when the at least one requested event is detected by the one or more servers of the first financial institution;

prompting the customer via the user interface to select at least one method of notification corresponding respectively to at least one user device configured to receive notifications via a corresponding communications channel;

prompting the customer via the user interface to select at least one time for notification;

formulating an alert prompt wherein the alert prompt includes,
  (i) the at least one requested event,
  (ii) the customer's at least one method of notification,
  (iii) the customer's at least one time for notification,
  (iv) information about the customer's at least one instruction; and storing the alert prompt in a first database of the notification system;

receiving account data containing financial information from at least one server of the second financial institution and at least one server of the first financial institution, via a communications platform connected to a network into a second database of the notification system, wherein the incoming financial information indicates a change in the value of the financial information in the account data;

comparing the incoming financial information with the at least one requested event of the alert prompt in the first database;

sending, via the communications platform connected to the network a notification message to each of the user devices of the customer via each of the communications data channels associated with each user device according to each of the customer's at least one method of notification at the customer's at least one time for notification when the at least one requested event matches the incoming financial information, wherein the notification message contains at least a confirmation request for execution of the at least one instruction; and upon confirmation being received from at least one user device, executing the at least one instruction, wherein the at least one server of the first financial institution according to the at least one instruction performs an action responding to the change in value of the monitored financial information.

6. A method implemented on a machine for notifying a customer of at least one requested event comprising:

transmitting, by a communications platform connected to a network and one or more servers of a first financial institution, to a user device a graphical interface comprising a first link to a first user interface and a second link to a second user interface, wherein the first user interface is for member customers affiliated with a financial institution providing a notification system and the second user interface is for non-member customers who are not affiliated with the financial institution providing the notification system;

upon receiving from the user device a selection by the customer of the first link, generating access data authenticating member customers;

upon receiving from the user device a selection of the second link, generating access data authenticating non-member customers;

prompting the customer, via the graphical interface, for the access data authenticating the member customers or non-member customers;

upon authenticating the user based upon the access data, providing the first or second user interface to the user device of the customer depending on the selection, wherein the first user interface provides a first set of customer-selectable events that is different than a second set of customer-selectable events in the second user interface;

prompting the customer, via the graphical interface, to select at least one requested event, wherein the at least one requested event is based on a change in value of monitored financial information stored in account data at a second financial institution detected by the one or more servers of the notification system of the first financial institution, the one or more servers of the first financial institution configured to continuously receive the account data containing the financial information from at least one server of the second financial institution;

storing the customer's at least one requested event selection in a first database;

prompting the customer, via the graphical interface, to select at least one instruction associated with the at least one requested event, wherein the one or more servers of the first financial institution are configured to execute the at least one instruction upon detecting the at least one requested event;

storing the customer's at least one instruction in a second database;

prompting the customer, via the graphical interface, to select at least one method of notification, each of the at least one method of notification associated with a respective data communications channel configured to support notification messages having a corresponding data format;

storing the customer's at least one method of notification selection in the first database;

prompting the customer, via the graphical interface, to select at least one time for notification;

storing the customer's at least one time for notification selection in the first database;

upon receiving the account data from the at least one server of the second financial institution containing the financial information that triggers the at least one requested event:

formulating, in an alert message generator executed by the one or more servers of the first financial institution configured to generate one or more notification messages according to at least one data format of at least one data communication channel associated with a respective user device of the customer, a first notification message that includes information about the at least one requested event, the first notification message having a format based upon each of the at least one notification method selection of the customer;

sending via the communications platform connected to the network the first notification message to each respective user device of the customer via each of the data communications channels associated with each of the customer's at least one method of notification at the customer's at least one time for notification;

upon the communications platform and the one or more servers receiving a reply from the user device of the customer to first notification message:

executing the at least one instruction by the first financial institution when the at least one requested event is detected by the one or more servers, wherein the one or more servers of the first financial institution execute the at least one instruction, whereby the one or more servers perform an action responding to the change in value of the monitored financial information received from the at least one server of the second financial institution;

formulating a second notification message, in the alert message generator, that includes information about the at least one instruction, the second notification message having the format based upon each of the at least one notification method selection of the customer; and sending via the communications platform connected to the network the second notification message to each respective user device of the customer via each of the data communications channels associated with each of the customer's at least one method of notification.

7. The method according to claim 6, further comprising prompting the customer, via the graphical interface, to select a method of payment for using the notification system.

8. The method according to claim 7, wherein only non-member customers are prompted to select a method of payment for using the notification system.

9. The method according to claim 6, wherein the second database contains customer-specific financial account information.

10. The method according to claim 9, wherein the customer is a non-member customer.

11. A system implemented on a machine for notifying a customer of at least one requested event comprising:

machine-readable storage of a notification system of a first financial institution, the machine storage storing one or more event notifications of a customer and one or more instructions for at least one server of the first financial institution to execute for the customer; and one or more servers of the first financial institution comprising one or more processors programmed to:

transmit to a user device of the customer a user interface generated by the one or more servers displaying a first link to a first user interface and a second link to a second user interface, wherein the first user interface is for member customers affiliated with a financial institution providing the notification system and the second user interface is for non-member customers who are not affiliated with the financial institution providing the notification system;

upon receiving a selection by the customer of the first link, generate access data authenticating member customers;

upon receiving a selection of the second link, generate access data authenticating non-member customers;

generate a user interface for display at the user device prompting the customer for the access data, and upon authenticating the customer based upon the access data, providing the first or second user interface to the user device of the customer depending on the selection, wherein the first user interface provides a first set of customer-selectable events that are different than a second set of customer-selectable events included in the second user interface;

generate a user interface for display at the user device prompting the customer to select at least one requested event and at least one instruction, wherein the at least one instruction is executed by the at least one server of the first financial institution when the at least one requested event is detected by the one or more servers of the first financial institution, and the at least one requested event is based on a change in value of monitored financial information detected by the one or more servers in account data received from at least one server of a second financial institution;

store in the machine storage the customer's at least one requested event selection and the customer's at least one instruction;

generate a user interface prompting the customer to select at least one method of notification and storing the customer's at least one method of notification selection in the machine storage, each of the at least one method of notification associated with a respective data communications channel configured to support notification messages having a corresponding data format; and generate a user interface prompting the customer to select at least one time for notification and storing the customer's at least one time for notification selection in the machine storage;

upon receiving account data containing the financial information from the at least one server of the second financial institution into the one or more servers of the notification system of the first financial institution:

formulate a notification message that includes information about the at least one requested event;

send the notification message via the respective communications channel to each of the user devices of the customer corresponding to each of the customer's at least one method of notification at the customer's at least one time for notification; and, upon receiving a reply from the customer, executing the at least one instruction by the financial institution when the at least one requested event is triggered, wherein the instruction performs an action responding to the change in value of the monitored financial information.

12. A system implemented on a machine for notifying a customer of at least one requested event comprising:

a customer profile server of a notification system of a first financial institution, the customer profile server storing one or more records of a customer's financial notification preferences, each respective record of the customer containing:

(i) at least one data field indicating at least one requested event, wherein the at least one requested event is based on a change in value of monitored financial information contained in account data received from at least one server of a second financial institution, (ii) at least one customer's notification method preference, each of the at least one notification method preferences indicating a corresponding user device configured to receive one or more messages from the notification system via a corresponding data communications channel, (iii) a customer's time for notification preferences; and (iv) at least one instruction, wherein the at least one instruction is executed by at least one server of the first financial institution upon detecting the at least one requested event;

the at least one server of the first financial institution comprising a processor executing the at least one instruction when the one or more servers detect the at least one requested event, wherein the at least one server executes an action indicated by the at least one instruction responding to the change in value of the monitored financial information detected by the one or more servers of the first financial institution in the account data received from the at least one server of the second financial institution;

a database of the first financial institution connected to the one or more servers and storing account data containing financial information received from the at least one server of the second financial institution and the one or more servers of the first financial institution;

a first notification message generator executed by the one or more servers connected to the customer profile server and the database containing the financial information, and configured to compare the change in the value indicated by the at least one requested event with the financial information of the account data in the database, and generate a first notification message according to a first data format associated with a first communications channel when the change in the value detected by one or more servers in the financial information matches the at least one requested event;

a first notification gateway hosted on the one or more servers of the first financial institution and coupled to the first communications channel, and configured to transmit the first notification message to the customer according to a first user device associated with the first notification gateway indicated by a first customer's notification method preferences and the time for notification preferences;

a second notification message generator executed by the one or more servers connected to the customer profile server and configured to generate a second notification message according to a second data format associated a second communications channel when the at least one instruction is executed by the at least one server of the first financial institution;

a second notification gateway hosted on the one or more servers of the first financial institution, and connected to the second notification message generator and the second communications channel, the second notification gateway configured to transmit the second notification message to a second user device of the customer according to a second customer's notification method preferences;

a first interface generator executed by the one or more servers of the first financial institution, the first interface generator configured to generate a first link to a first website and a second link to a second website provided to the customer depending on whether the customer is a member customer or a non-member customer, wherein the first website is for member customers affiliated with a financial institution providing the notification system and the second website is for non-member customers who are not affiliated with the financial institution providing the notification system;

a second interface generator executed by the one or more servers of the first financial institution, the second interface generator configured to generate a first set of customer-selectable events to be displayed on the first website and a second set of customer-selectable events to be displayed on the second website, wherein the first set is different than the second set; and a notification report generator connected to the customer profile server and executed by the one or more servers of the first financial institution, the notification report generator configured to generate a notification report interface displaying at least one data describing each notification message sent to the customer during a customer selected period of time, wherein the customer profile server further comprises a database storing the at least one data describing each respective notification message generated by one or more notification message generators.

13. The system according to claim 12, wherein the at least one requested event is related to one of the following group consisting of a customer checking account, a customer savings account, a customer financial portfolio, a customer credit card, foreign exchange rates, interest rates, and loans.

14. The system according to claim 12, wherein the customer's notification method preferences are selected from the following group consisting of electronic mail, hypertext mark-up language, pager, mobile phone text messaging, extensible mark-up language, facsimile, short message service, and telephone.

15. The system according to claim 12, wherein the customer's notification time preferences are selected from the following group consisting of instantaneously, hourly, daily, weekly, and monthly.

16. The system according to claim 12, wherein the first financial institution is hosting the system.

17. The system according to claim 12, wherein the second financial institution is accessible over the Internet.

18. The system according to claim 12, wherein the second financial institution is not hosting the system.

19. The system according to claim 12, wherein customers are identified in the database as being either member customers or non-member customers.

20. The system according to claim 12, wherein the financial information includes customer's checking account balance, customer's savings account balance, customer's portfolio value, and interest rates.

21. The system according to claim 12, wherein the generating a customer's financial notification preferences includes a customer service representative.

* * * * *